(12) United States Patent
Nishizawa

(10) Patent No.: US 12,443,919 B1
(45) Date of Patent: Oct. 14, 2025

(54) ORDER QUANTITY PREDICTING SYSTEM FOR CAFETERIA

(71) Applicant: NS SYSTEM INC., Tokyo (JP)

(72) Inventor: Yasuo Nishizawa, Tokyo (JP)

(73) Assignee: NS SYSTEM INC., Tokyo (JP)

( * ) Notice: Subject to any disclaimer, the term of this patent is extended or adjusted under 35 U.S.C. 154(b) by 0 days.

(21) Appl. No.: 18/980,348

(22) Filed: Dec. 13, 2024

(30) Foreign Application Priority Data

Jul. 30, 2024 (JP) ................. 2024-123695

(51) Int. Cl.
*G06Q 10/087* (2023.01)
*G06Q 50/12* (2012.01)

(52) U.S. Cl.
CPC .......... *G06Q 10/087* (2013.01); *G06Q 50/12* (2013.01)

(58) Field of Classification Search
CPC ............. G06Q 10/087; G06Q 30/0234; G06Q 30/0283; G06Q 30/0611
See application file for complete search history.

(56) References Cited

U.S. PATENT DOCUMENTS

2022/0343903 A1* 10/2022 Mostafazadeh ......... G10L 15/16

FOREIGN PATENT DOCUMENTS

| JP | 2018185591 A | * | 11/2018 |
| JP | 2022151655 A | | 10/2022 |
| JP | 2023117423 A | * | 8/2023 |

OTHER PUBLICATIONS

Hoshino Tomohiro, "the approach to the increase in efficiency of the restaurant management using machine learning", the 2018 fiscal year the Japanese Society for Artificial Intelligence national conference (the 32nd time), general incorporated foundation Japanese Society for Artificial Intelligence, Jun. 5, 2018, pp. 1-3.
Japan Patent Office, Office Action, Aug. 30, 2024.

* cited by examiner

*Primary Examiner* — Ariel J Yu
*Assistant Examiner* — Denisse Y Ortiz Roman
(74) *Attorney, Agent, or Firm* — Umberg Zipser LLP; Ryan Dean

(57) ABSTRACT

To provide a system capable of predicting order quantities even under specific conditions where primary visitors are particular users who repeatedly visit a cafeteria and consume food and beverages.
An order quantity predicting system for a cafeteria, the order quantity predicting system comprising a past order history database, an external factor database, an order pattern model generating unit, an order quantity prediction calculating unit, and an order quantity update calculating unit.

8 Claims, 23 Drawing Sheets

[FIG. 1]
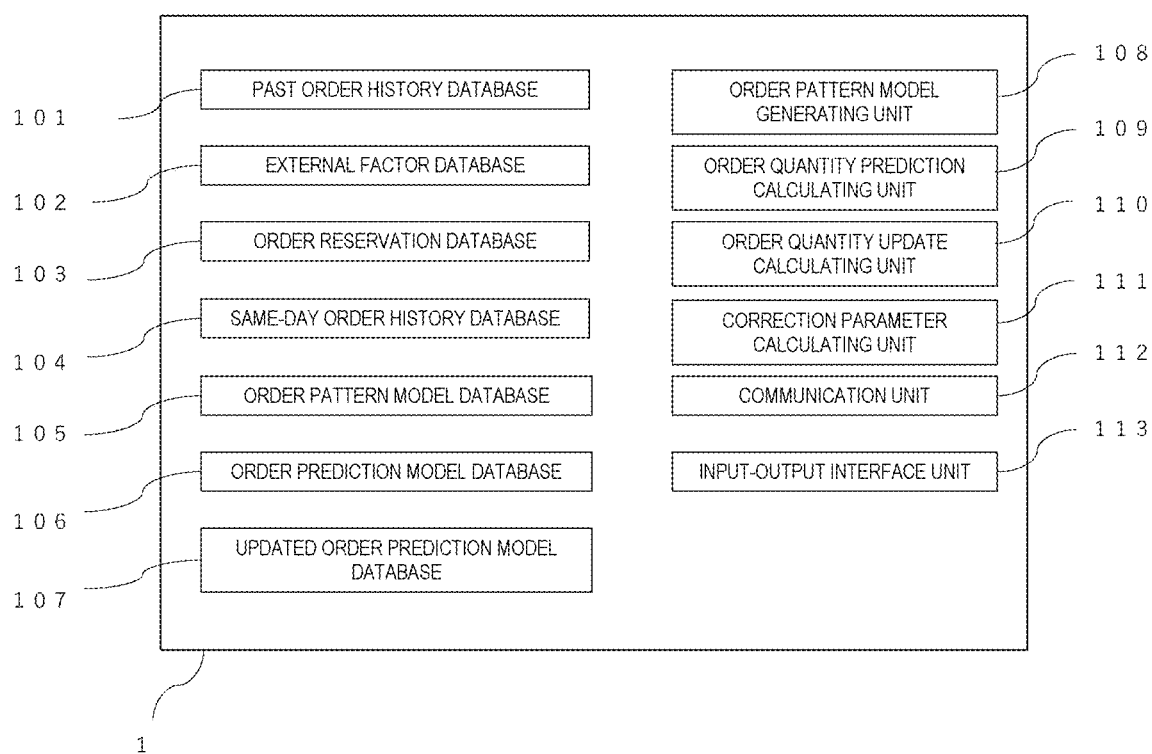

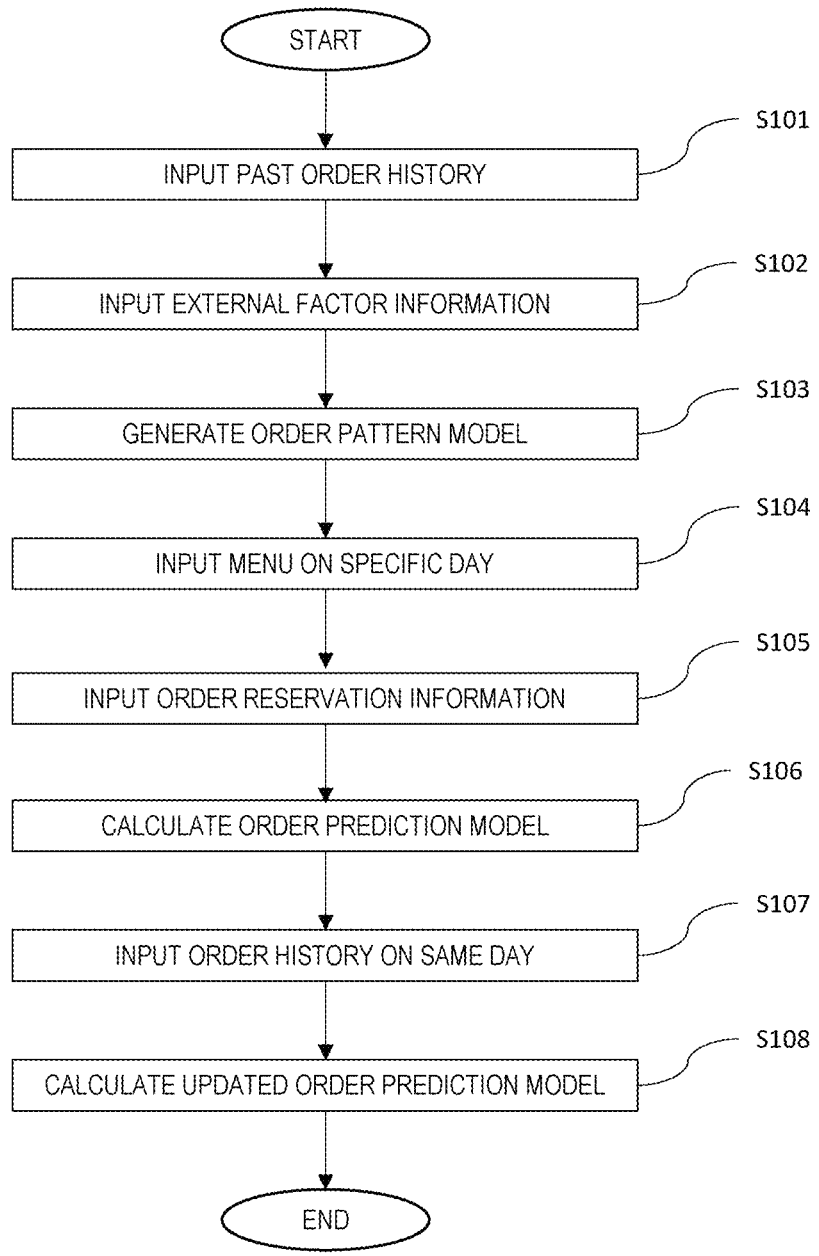
[FIG. 2]

[FIG. 3]
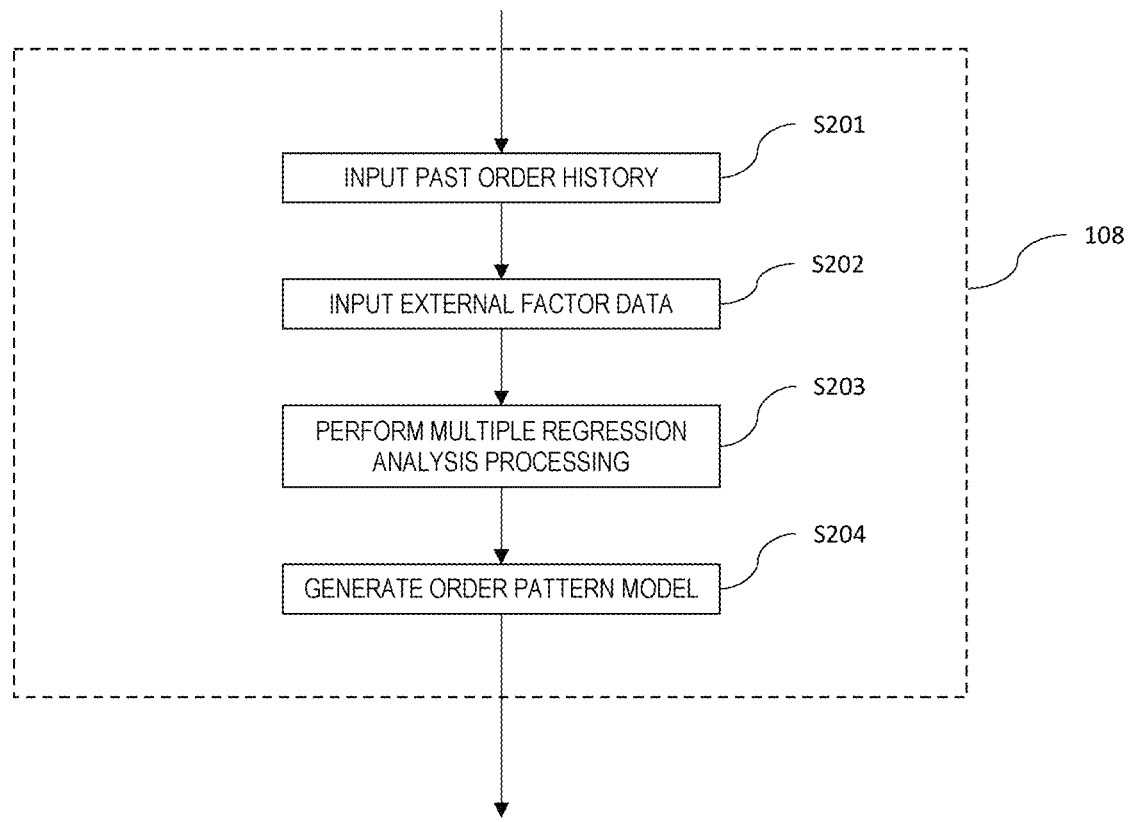

[FIG. 4]
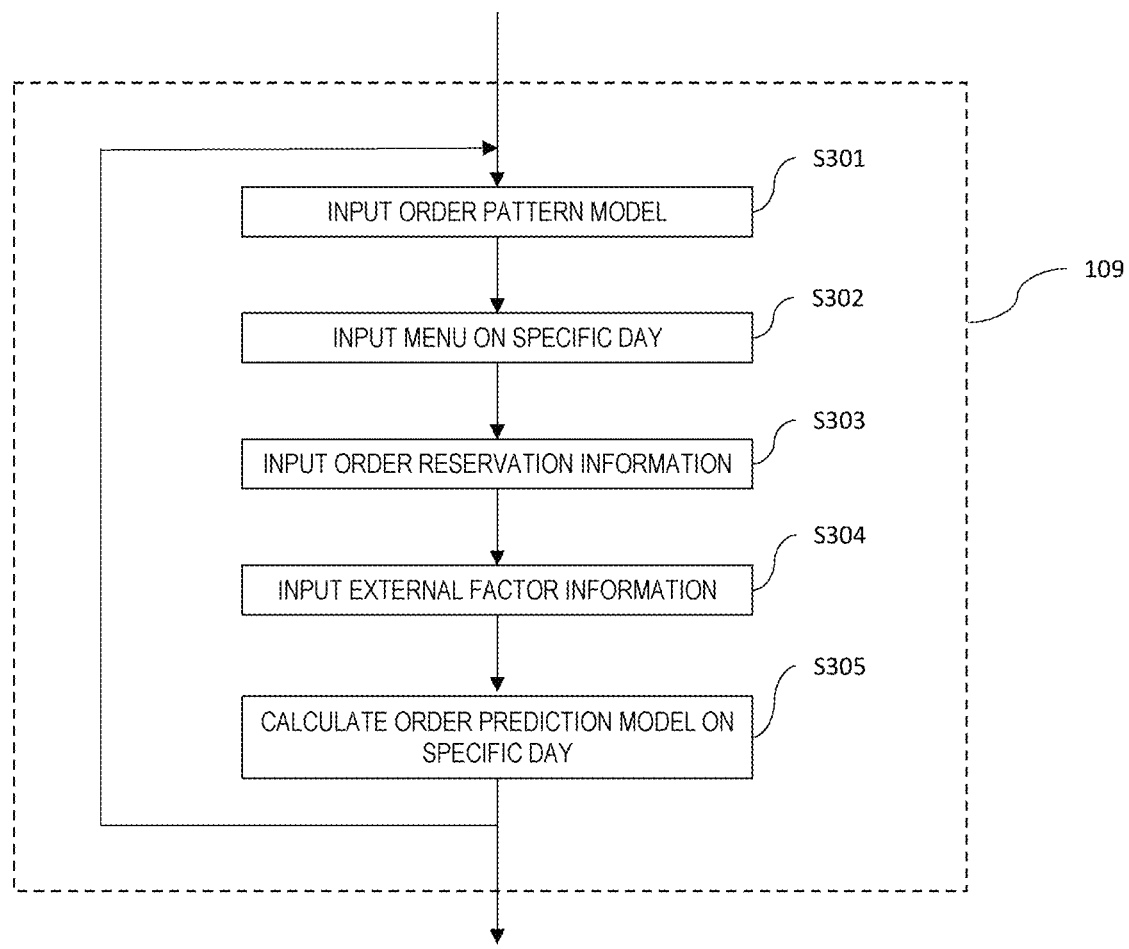

[FIG. 5]
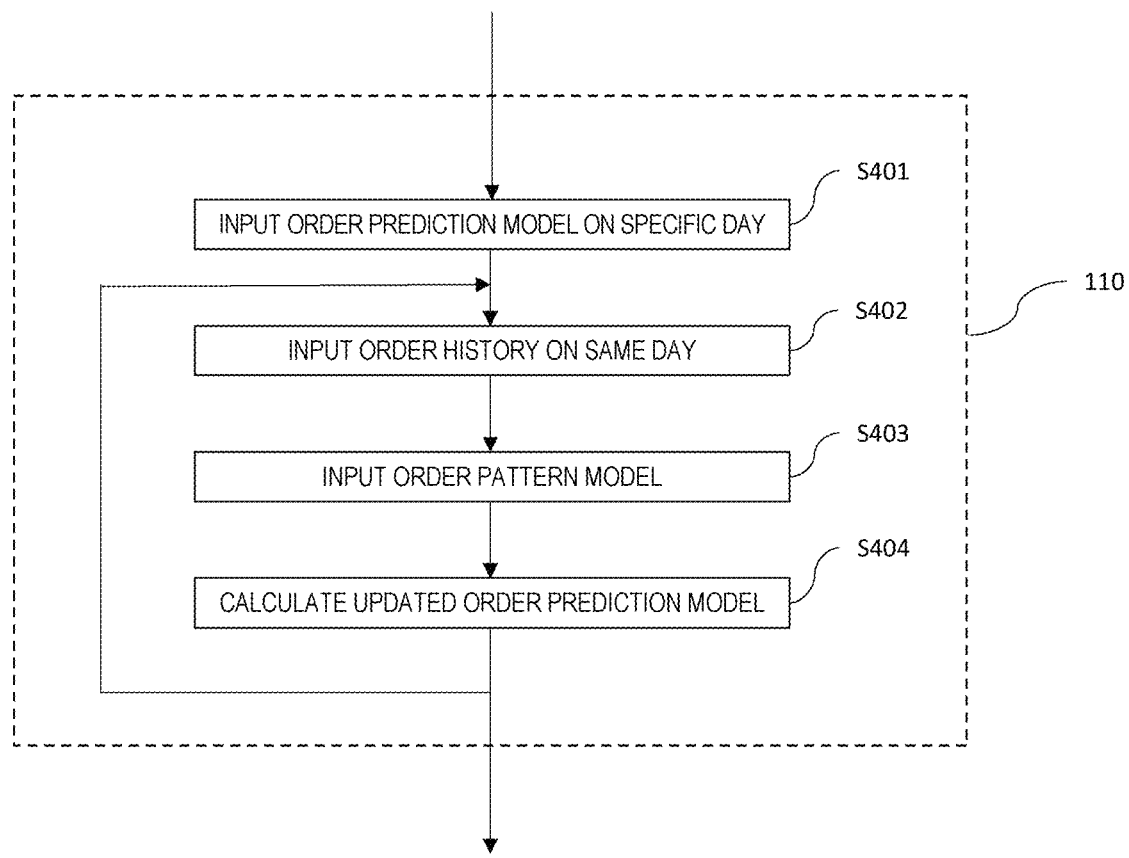

[FIG. 6]
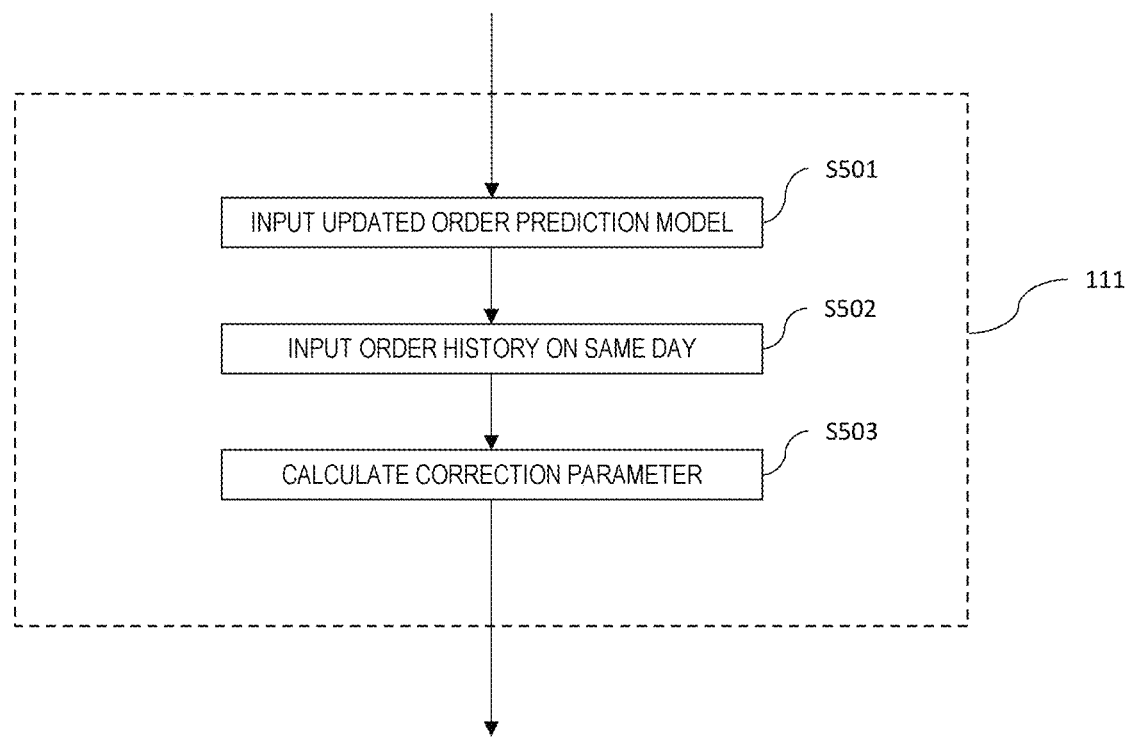

[FIG. 7]
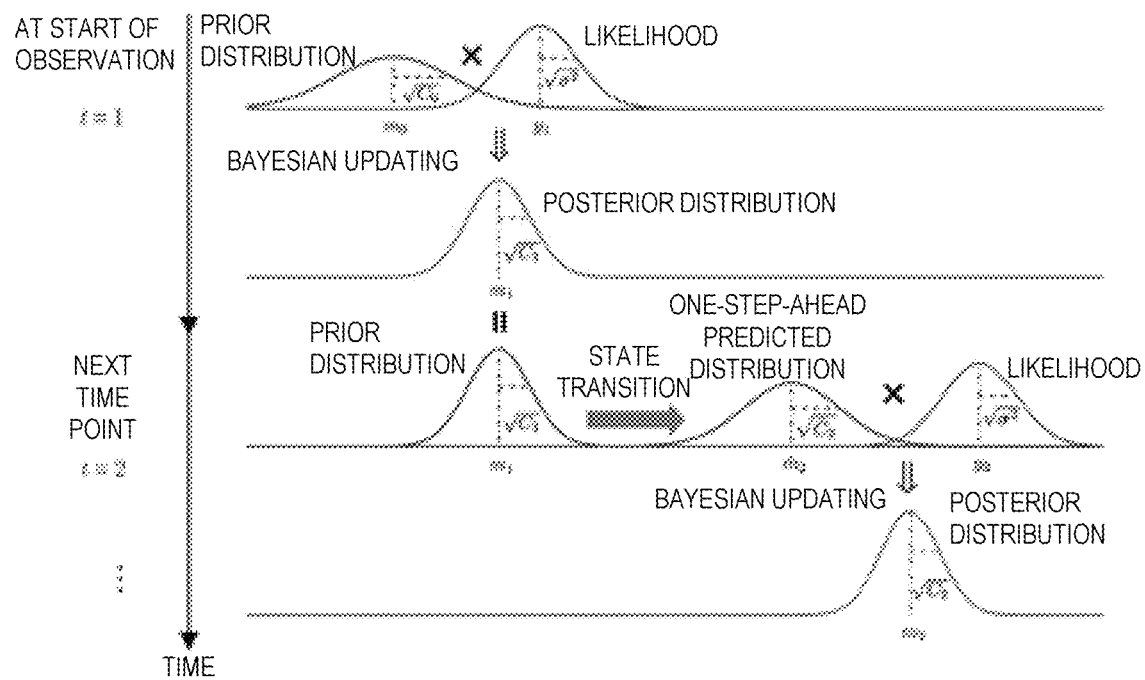

[FIG. 8]
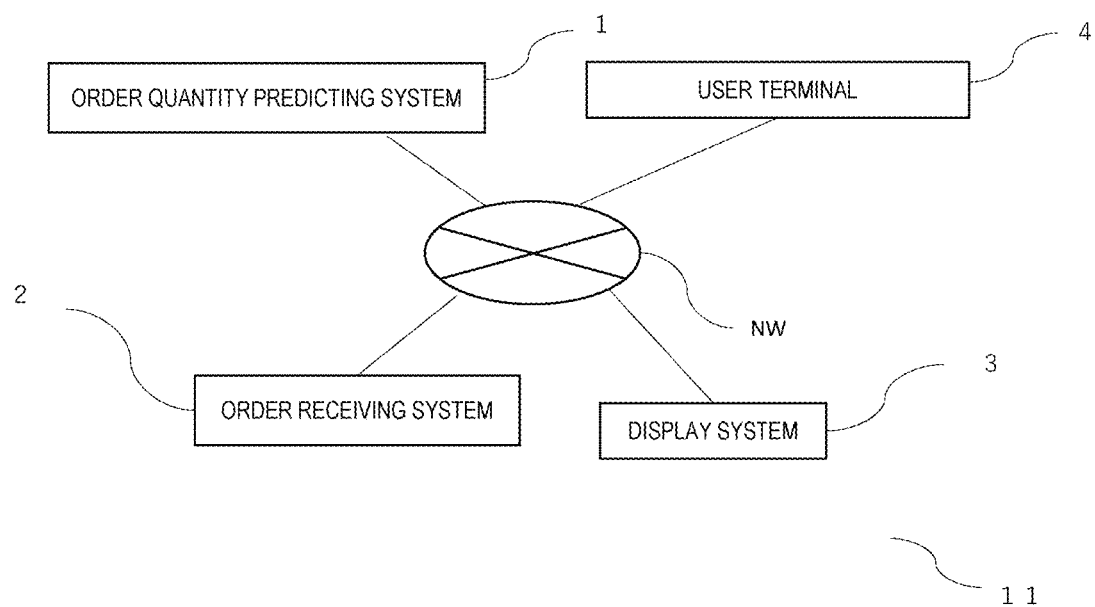

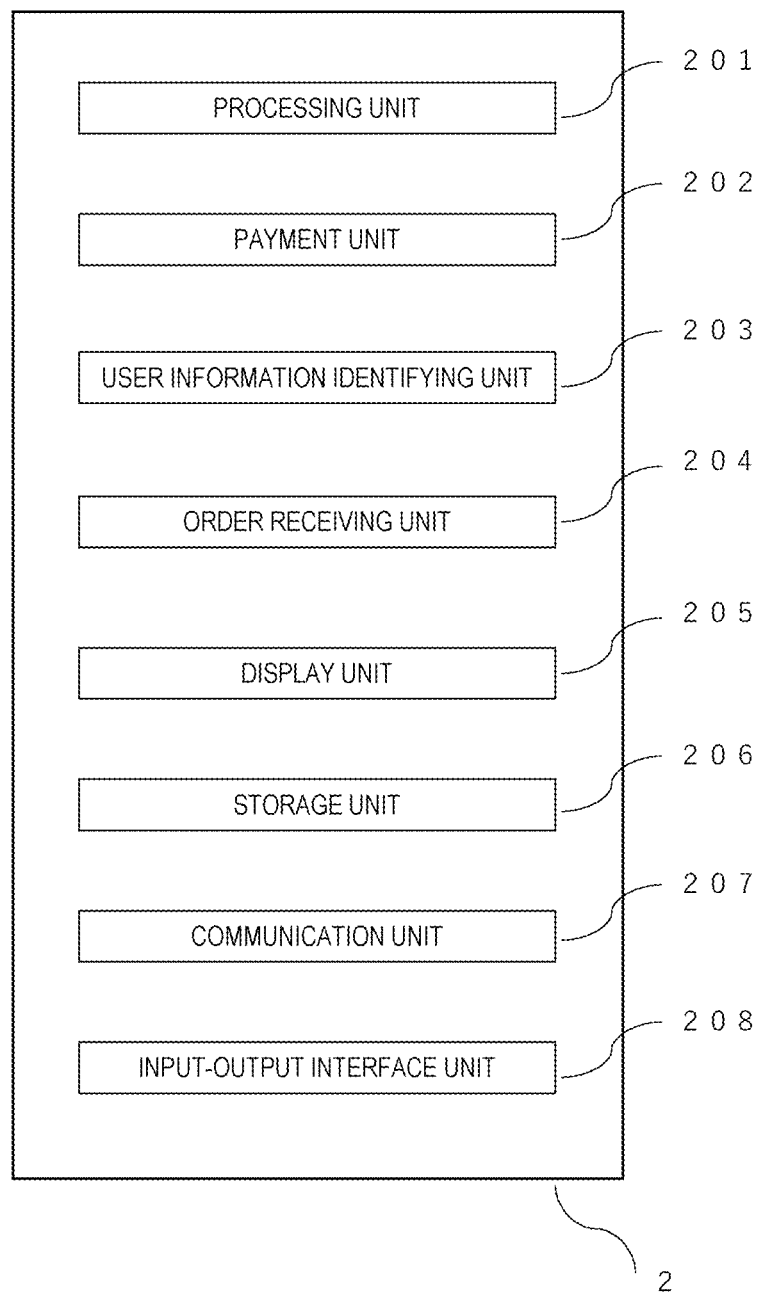
[FIG. 9]

[FIG. 10]
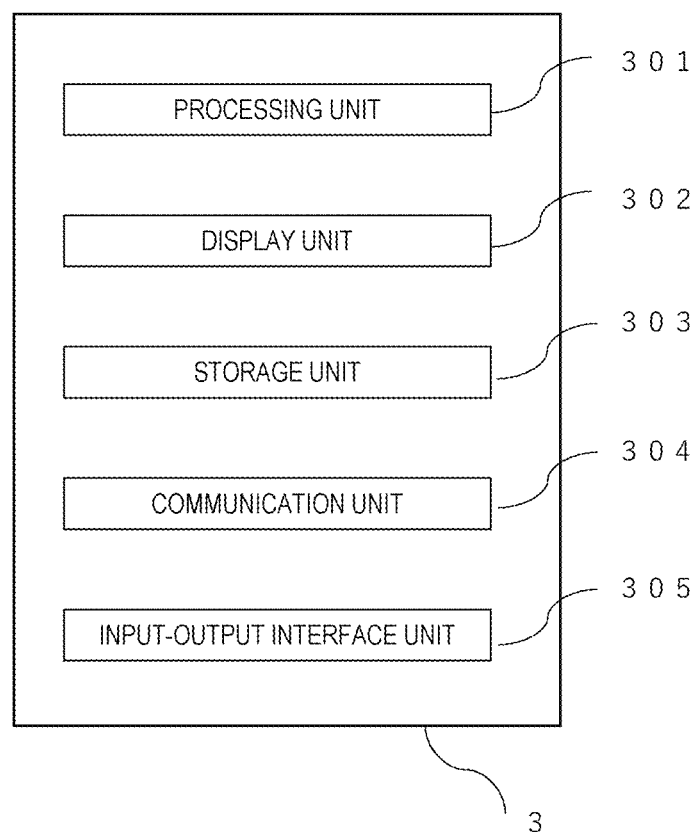

[FIG. 11]
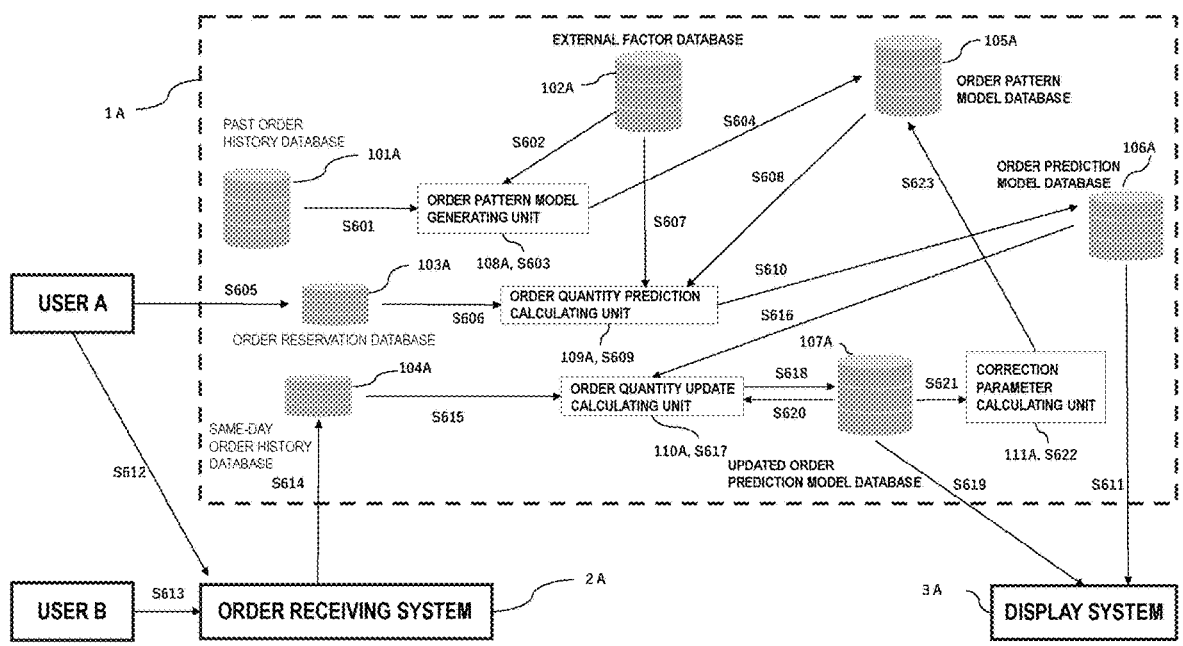

[FIG. 12]

| | DATE | VISIT TIME (ORDER TIME) | SELECTED MENU ITEM 1 | CALORIE 1 (Kcal) | NUTRIENTS 1 (SALT) (CARBOHYDRATES) (FAT) | | | SELECTED MENU ITEM 2 | CALORIE 2 (Kcal) | NUTRIENTS 2 (SALT) (CARBOHYDRATES) (FAT) | | |
|---|---|---|---|---|---|---|---|---|---|---|---|---|
| PERSON A | JANUARY 4TH | 11:45 | RAMEN | 400 | 200 | 300 | 40 | TAKOYAKI | 100 | 20 | 30 | 12 |
| | 5TH | 11:47 | GRILLED FISH SET MEAL | 520 | 100 | 100 | 40 | SALAD | 70 | 10 | 10 | 34 |
| | 6TH | 11:58 | STIR-FRIED VEGETABLES SET MEAL | 560 | 150 | 300 | 60 | GRILLED EGGPLANT | 160 | 60 | 30 | 25 |
| ATTRIBUTES SEX: MALE AGE: 45 JOB POSITION: MANAGERIAL OTHER ATTRIBUTE DATA | APRIL 5TH | 12:15 | GRILLED MEAT SET MEAL | 780 | 200 | 200 | 40 | PICKLES | 80 | 20 | 20 | 34 |
| | MAY 6TH | 11:59 | KATSUDON | 690 | 300 | 300 | 60 | SPRING ROLLS | 200 | 19 | 70 | 45 |
| | JUNE 25TH | 12:04 | RAMEN | 530 | 200 | 200 | 30 | DUMPLINGS | 160 | 25 | 20 | 30 |

| | DATE | | | | | | | | | | | |
|---|---|---|---|---|---|---|---|---|---|---|---|---|
| PERSON B | JANUARY 4TH | 12:25 | SALAD A | 100 | 20 | 0 | 0 | | | | | |
| | 5TH | 12:47 | TOFU SET MEAL | 220 | 40 | 200 | 20 | | | | | |
| ATTRIBUTES SEX: FEMALE AGE: 28 JOB POSITION: CLERICAL OTHER ATTRIBUTE DATA | 6TH | 11:58 | PASTA | 460 | 70 | 340 | 20 | | | | | |
| | APRIL 5TH | 12:55 | DORIA | 580 | 200 | 300 | 20 | | | | | |
| | MAY 6TH | 11:34 | SOBA | 290 | 30 | 30 | 60 | | | | | |
| | JUNE 25TH | 12:27 | UDON | 130 | 20 | 100 | 30 | | | | | |

[FIG. 13]
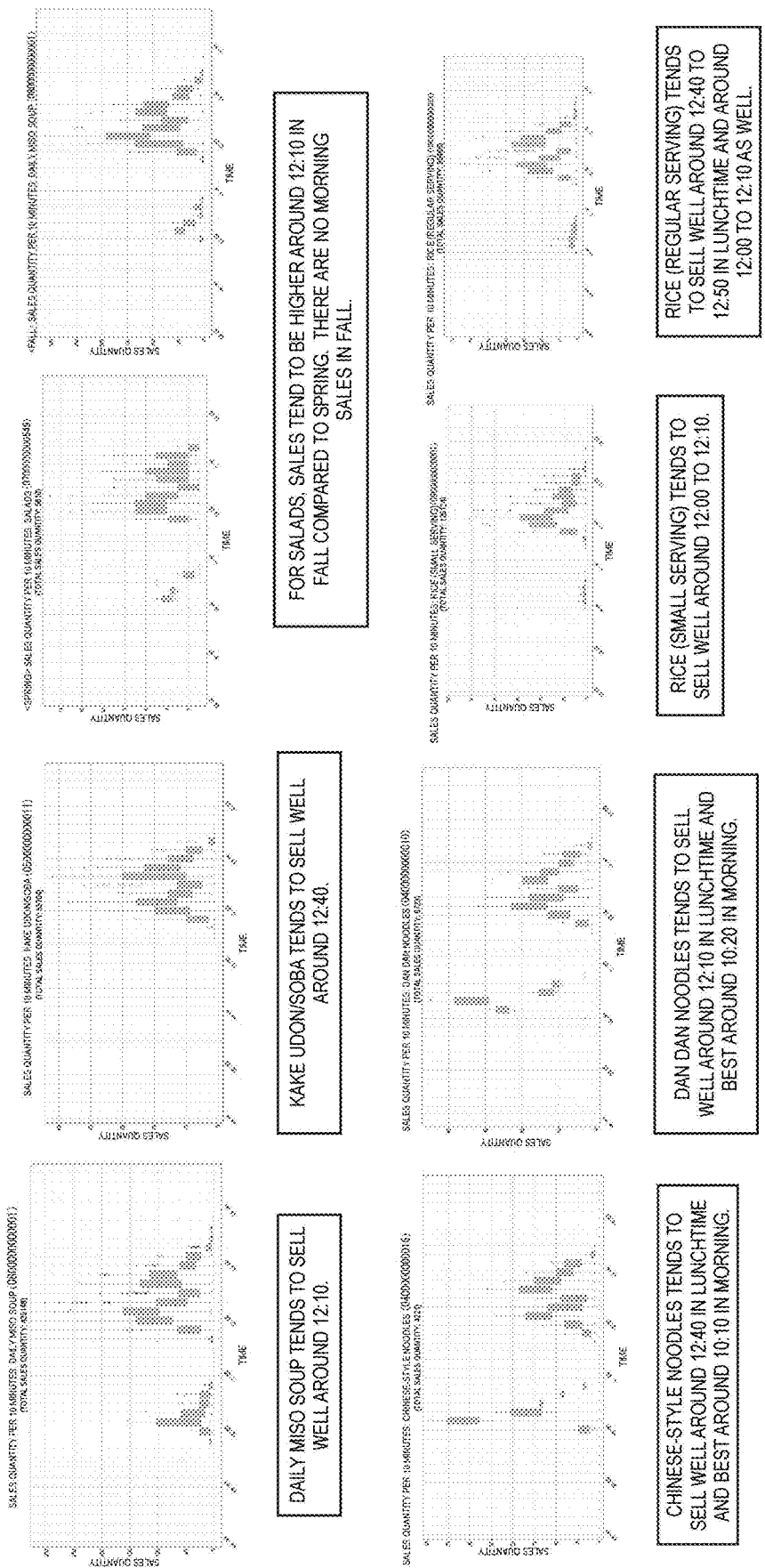

[FIG. 14]
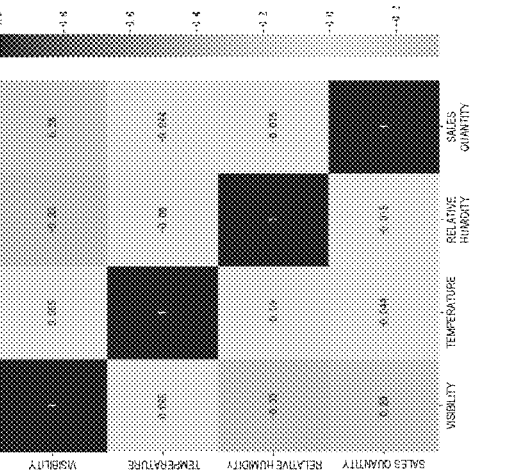
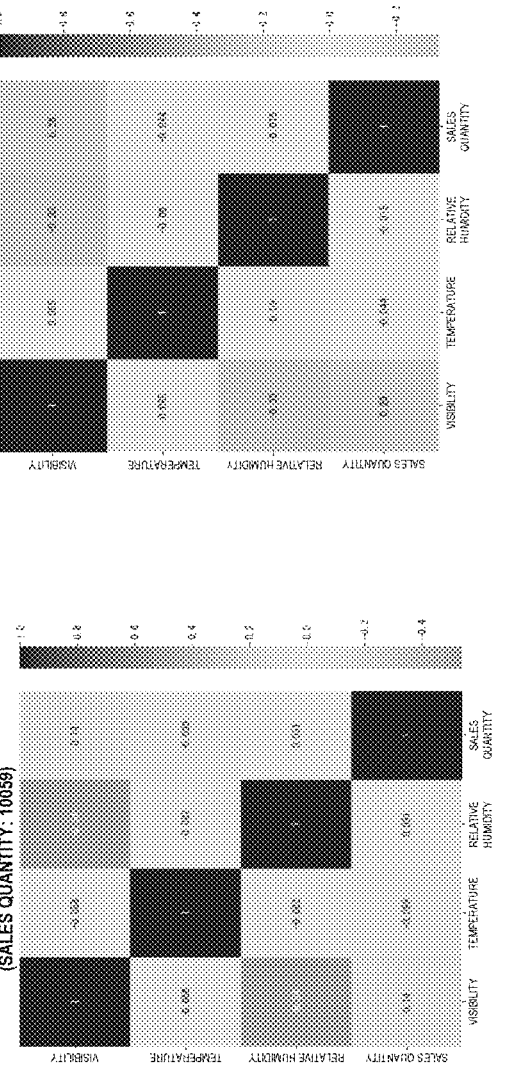
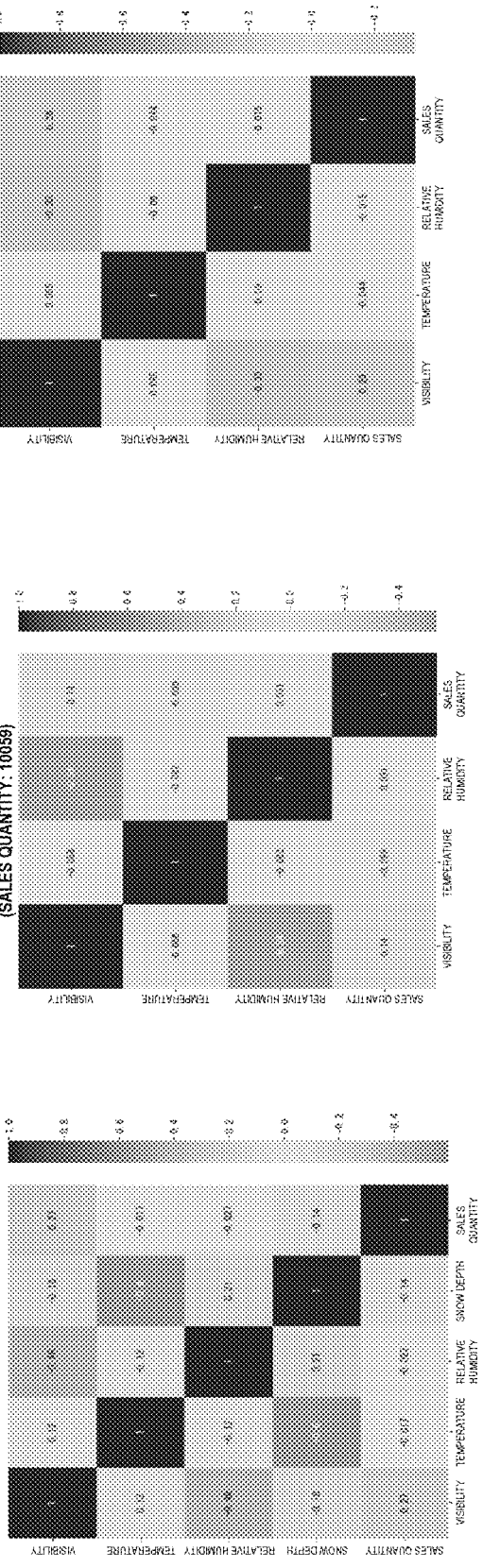

[FIG. 15]
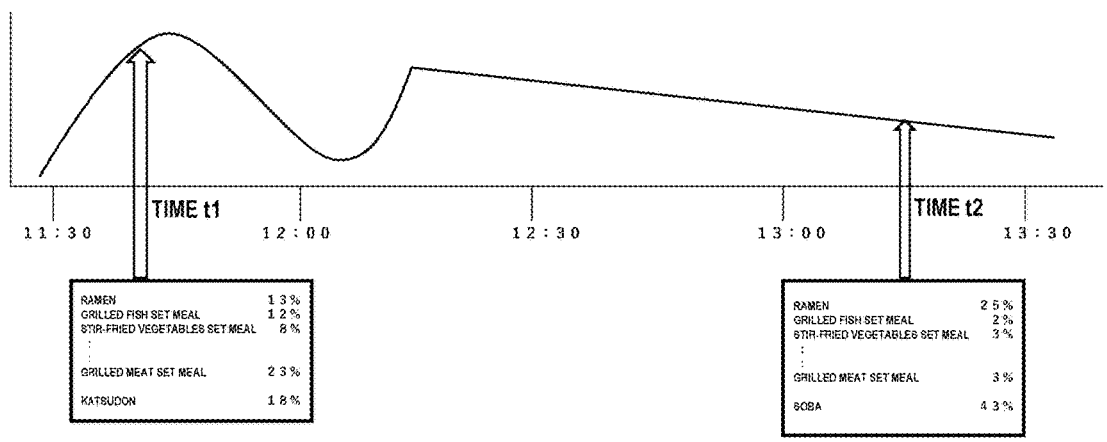

[FIG. 16]
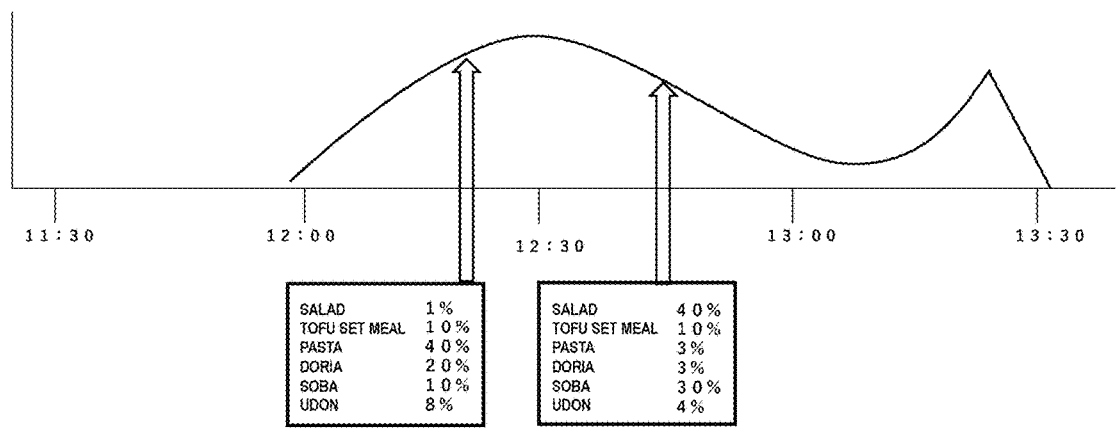

[FIG. 17]

| | RESERVATION RECEPTION DATE AND TIME | RESERVATION DATE | SELECTED MENU ITEM 1 | SELECTED MENU ITEM 2 |
|---|---|---|---|---|
| PERSON A | JANUARY 4TH, 8:50 | JANUARY 6TH | RAMEN | SALAD |

ATTRIBUTES
SEX: MALE
AGE: 45
JOB POSITION: MANAGERIAL
OTHER, ATTRIBUTE DATA

[FIG. 18]
ORDER PREDICTION MODEL FOR PERSON A ON SPECIFIC DAY X
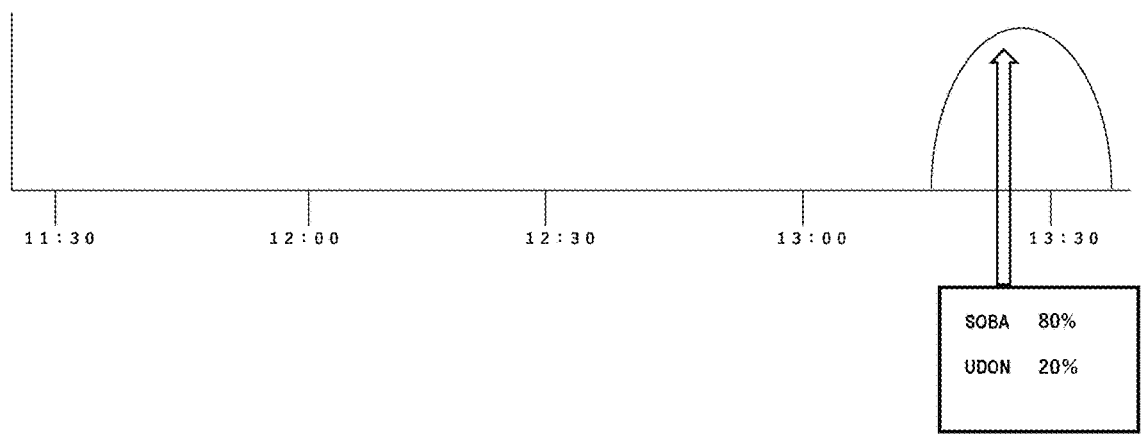

[FIG. 19]
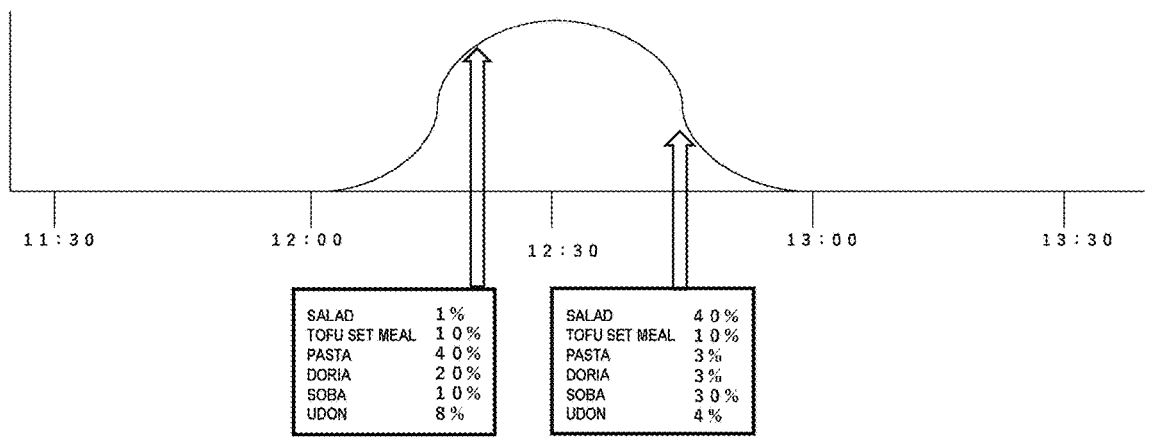

[FIG. 20]
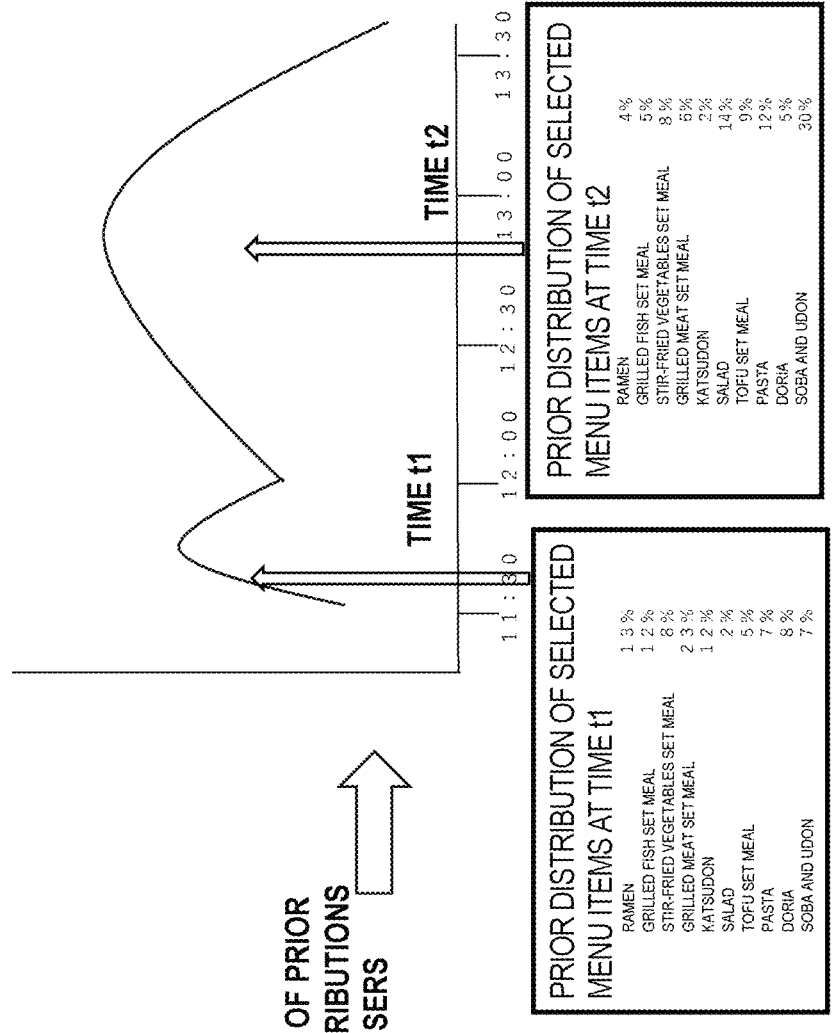
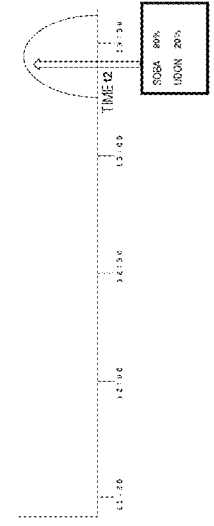
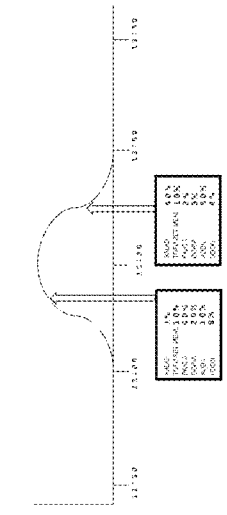

[FIG. 21]
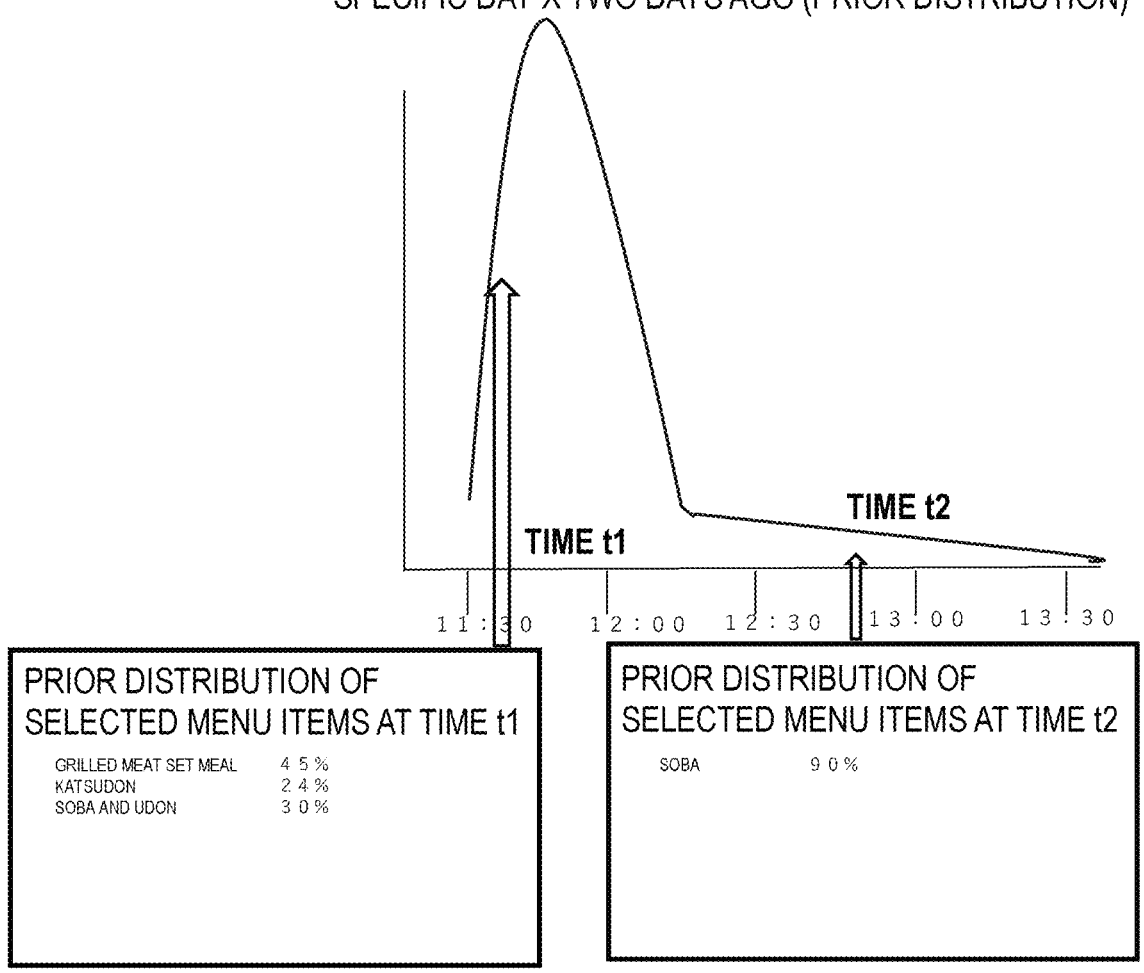

[FIG. 22]

|  | ATTRIBUTES | VISIT TIME (ORDER TIME) | SELECTED MENU ITEM 1 | SELECTED MENU ITEM 2 |
|---|---|---|---|---|
| PERSON A | SEX: MALE<br>AGE: 45<br>JOB POSITION: MANAGERIAL<br>OTHER, ATTRIBUTE DATA | 1 1 : 4 5 | RAMEN | SALAD |
| PERSON B | ATTRIBUTES<br>SEX: FEMALE<br>AGE: 26<br>JOB POSITION: CLERICAL<br>OTHER, ATTRIBUTE DATA | 1 1 : 5 1 | PASTA | |

[FIG. 23]
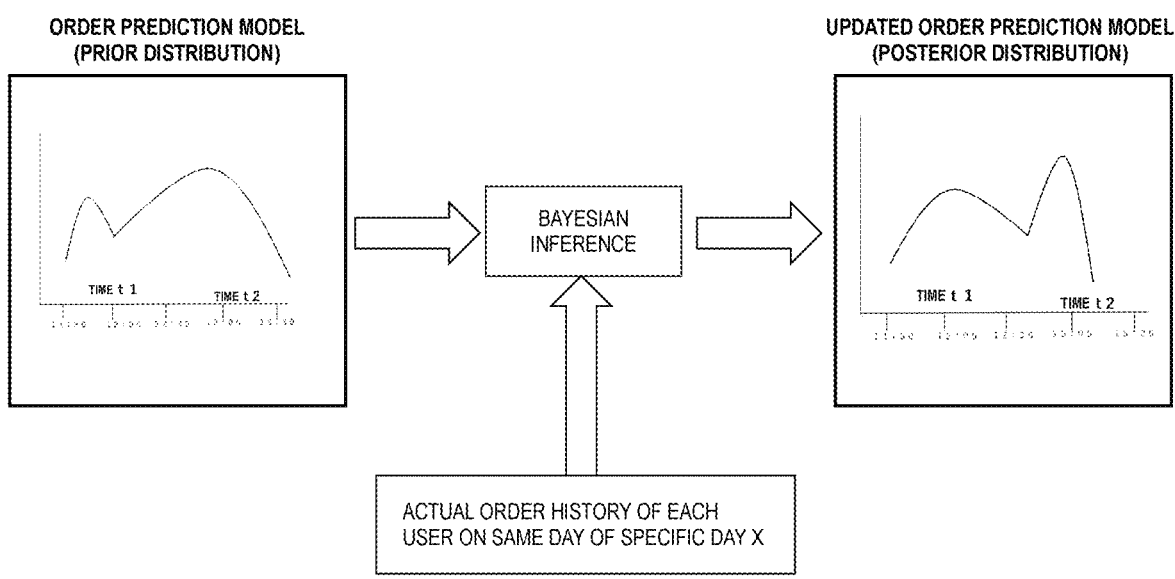

ORDER QUANTITY PREDICTING SYSTEM FOR CAFETERIA

CROSS REFERENCE TO RELATED APPLICATIONS

This application is based upon and claims the benefit of priority from the prior Japanese Patent Application No. 2024-123695, filed on Jul. 30, 2024, the entire contents of which are incorporated herein by reference.

BACKGROUND OF THE INVENTION

Field of the Invention

The present disclosure relates to an order quantity predicting system for a cafeteria.

Related Art

Recently, it has become extremely important to accurately predict daily order placement quantities in advance at places where food and beverages are provided, such as cafeterias and restaurants, to achieve SDGs. Thus, for example, it is common for a cafeteria operating company that manages cafeteria operations to have large-scale databases. Such databases typically analyze how much of a menu has been sold per day and store data over many years.

Systems that analyze store data such as the number of store visitors, average spending per customer, best-selling items, busy days, time periods, and year-over-year comparisons and predict order quantities for the number of visitors and other data for the following day or year ahead have been recently considered.

SUMMARY OF THE INVENTION

With a conventional system, which is merely a model that predicts the number of visitors and their visiting times for unspecified visitors, it is extremely difficult to predict a demand for order placement under specific conditions where primary visitors are particular users who repeatedly visit a cafeteria and consume food and beverages, in other words, extremely high-volume concentrated order placement within a limited timeframe.

It is one objective of the present disclosure to provide a system capable of predicting order quantities even under specific conditions where primary visitors are particular users who repeatedly visit a cafeteria and consume food and beverages.

Upon thorough investigation, the present discloser has unexpectedly found that it is possible to predict order quantities in a cafeteria by performing calculations using Bayesian statistical methods based on attribute information of a user and an order history of the user. The present disclosure is based on such findings.

According to an aspect of the present disclosure, an order quantity predicting system for a cafeteria is provided, the order quantity predicting system including a past order history database, an external factor database, an order pattern model generating unit, an order quantity prediction calculating unit, and an order quantity update calculating unit, in which the past order history database configured to store a past order history in the cafeteria for each user in association with attribute information of the user and the chronological sequence, the external factor database configured to store any information except for the order history in association with the chronological sequence, the order pattern model generating unit configured to generate an order pattern model for each user along the chronological sequence, an order pattern model for each attribute along the chronological sequence, and/or an order pattern model for the entire cafeteria along the chronological sequence based on information stored in the past order history database and information stored in the external factor database, the order quantity prediction calculating unit configured to (1) calculate an order prediction model for each user along the chronological sequence of a specific date based on an order pattern model for each user, a menu of the specific date, and information related to the specific date and stored in the external factor database, and calculate an order prediction model for the entire cafeteria along the chronological sequence of the specific date based on the sum of the order prediction model for each user, (2) calculate an order prediction model for each attribute along the chronological sequence of a specific date based on the order pattern model for each attribute, a menu of the specific date, and information related to the specific date and stored in the external factor database, and calculate an order prediction model for the entire cafeteria along the chronological sequence of the specific date based on the sum of the order prediction model for each attribute, and/or (3) calculate an order prediction model for the entire cafeteria along the chronological sequence of a specific date based on the order pattern model for the entire cafeteria, a menu of the specific date, and information related to the specific date and stored in the external factor database, and the order quantity update calculating unit configured to (1) calculate an updated order prediction model for each user along the chronological sequence, which is obtained by updating the order prediction model for each user by a Bayesian statistical method based on an actual order history of a specific date for each user, and calculate an updated order prediction model for the entire cafeteria along the chronological sequence of the specific date based on the updated order prediction model for each user, (2) calculate an updated order prediction model for each attribute along the chronological sequence, which is obtained by updating the order prediction model for each attribute by a Bayesian statistical method based on an actual order history of a specific date for each user, and calculate an updated order prediction model for the entire cafeteria along the chronological sequence of the specific date based on the updated order prediction model for each attribute, and/or (3) calculate an updated order prediction model for the entire cafeteria along the chronological sequence of the specific date, which is obtained by updating the order prediction model for the entire cafeteria by a Bayesian statistical method based on an actual order history of a specific date for each user.

According to an aspect of the present disclosure, it is possible to provide a system capable of predicting order quantities even under specific conditions where primary visitors are particular users who repeatedly visit a cafeteria and consume food and beverages.

BRIEF DESCRIPTION OF THE DRAWINGS

FIG. 1 illustrates an example of a functional block diagram of an order quantity predicting system of the present disclosure;

FIG. 2 illustrates an example of the processing flow of the order quantity predicting system of the present disclosure;

FIG. 3 illustrates the processing flow of an order pattern model generating unit in the order quantity predicting system of the present disclosure;

FIG. 4 illustrates the processing flow of an order quantity prediction calculating unit of the present disclosure;

FIG. 5 illustrates the processing flow of an order quantity update calculating unit of the present disclosure;

FIG. 6 illustrates a correction parameter calculating unit of the present disclosure;

FIG. 7 illustrates an example of a conceptual diagram of Bayesian inference;

FIG. 8 illustrates a schematic diagram of a cafeteria order system of the present disclosure;

FIG. 9 illustrates an example of a functional block diagram of an order receiving system of the present disclosure;

FIG. 10 illustrates an example of a functional block diagram of a display system of the present disclosure;

FIG. 11 illustrates an example of the order quantity predicting system and the cafeteria order system of the present disclosure;

FIG. 12 illustrates an example of information stored in a past order history database of the present disclosure;

FIG. 13 illustrates an example of multiple regression analysis results in the order pattern model generating unit of the present disclosure (box plot analysis);

FIG. 14 illustrates an example of multiple regression analysis results in the order pattern model generating unit of the present disclosure (Pearson correlation analysis);

FIG. 15 illustrates an example of an order pattern model generated by the order pattern model generating unit of the present disclosure;

FIG. 16 illustrates an example of the order pattern model generated by the order pattern model generating unit of the present disclosure;

FIG. 17 illustrates an example of information stored in an order reservation database of the present disclosure;

FIG. 18 illustrates an example of an order prediction model calculated for each user by the order quantity prediction calculating unit of the present disclosure;

FIG. 19 illustrates an example of the order prediction model calculated for each user by the order quantity prediction calculating unit of the present disclosure;

FIG. 20 illustrates an example of the order prediction model calculated for the entire cafeteria by the order quantity prediction calculating unit of the present disclosure;

FIG. 21 illustrates an example of the order prediction model calculated for the entire cafeteria by the order quantity prediction calculating unit of the present disclosure;

FIG. 22 illustrates an example of information stored in a same-day order history database of the present disclosure; and FIG. 23 illustrates an example of an updated order prediction model calculated for the entire cafeteria by the order quantity update calculating unit of the present disclosure.

DETAILED DESCRIPTION OF THE INVENTION

[Conventional Systems and Social Background]

Conventional systems were unable to perform data analysis focused on individual persons in a high-volume supply cafeteria in what is called a "closed environment", such as a cooperate or student cafeteria, where it is almost certain that a large number of specific members visit and these members are almost always the same individuals.

In other words, the conventional systems are capable of predicting the number of visitors, the number of best-selling menu items, and the like in advance, but information related to individual user attributes is hardly, if ever, taken into consideration. In a "closed organization" such as a company or a school, it is assumed that its members are almost always the same individuals, and the conventional systems were not designed to handle phenomena specific to cafeterias where such members visit regularly (for example, almost daily). Accordingly, the conventional systems provide what can be described as static predictions, such as predictions of the number of visitors and the number of ordered menu items in advance, cannot achieve predictions focused on individual persons and based on past eating data of individual members in a cafeteria under a closed environment where specific members eat daily, and were not suitable for predictions in a high-volume supply cafeteria under a "closed environment" where members visit and consume food and beverages in a concentrated manner within a limited timeframe.

The conventional systems are primarily designed to excel in predicting visitors to a plurality of typical restaurants and specific restaurants (cafeterias) at sightseeing places. In other words, the conventional systems are capable of accurately predicting the number of visitors based on past visitor data with information such as season, weather, and day of the week. The conventional systems are also capable of relatively accurately predicting, for example, visitor arrival times and the number of best-selling menu items consumed (ordered). However, such conventional systems are not very effective in a high-volume supply cafeteria under a "closed environment" in a "closed organization". With visitor prediction on time only, it is impossible to fully predict a demand for extremely high-volume concentrated order placement within a limited timeframe, which is needed in a high-volume supply cafeteria under a "closed environment", and to focus on a characteristic that specific members daily eat, which is specific to a cafeteria under a "closed environment" where members of a "closed organization" are repeatedly visit and consume food and beverages.

A high-volume supply cafeteria under a "closed environment" in a "closed organization" has a characteristic that the same individuals, namely members of the organization, use the cafeteria regularly (for example, almost daily). Furthermore, members who are always present in a closed environment tend to visit during concentrated time periods, a high-volume supply cafeteria under such a "closed environment" has a largest number of visitors in time periods such as between 12:00 to 12:15 when lunch breaks starts, and it is customary for visitors to rush during these time periods. Accordingly, such a high-volume supply cafeteria under a "closed environment" regularly experience peak congestion, which is its special characteristic. Conventional predicting systems are not designed to accurately predict the number of visitors in such an extreme concentrated state and thus not capable of predicting the number of people rushing during time periods such as 12:00 to 12:15 every day nor predicting the number of ordered menu items, and furthermore, have no functions to, for example, predict the number of visitors for the remaining time until the cafeteria closes at 13:30 based on a situation up to 12:15 and to adjust prediction of the ordered number of each menu item. In such a high-volume supply cafeteria under a "closed environment", it is normal that almost the same members visit and consume food and beverages regularly (for example, almost daily) in an extremely concentrated manner in limited time periods, but there has been no system capable of performing dynamic predictions that revise future order quantities from moment to moment in such a normal situation. However, it is precisely such a dynamic order prediction that is needed in a high-volume supply cafeteria under a "closed environment", but conventional systems have not had no functions to meet this need.

As a result, the current situation is that the person in charge (for example, the head chef) of a high-volume supply cafeteria under a "closed environment" relies only on intuition and human judgement to handle short-term concentrated influx of visitors and orders as a normal situation in the cafeteria. For example, in a cafeteria operating company, the person in charge of a high-volume supply cafeteria under a "closed environment" predicts order quantities and performs order predictions for the menu items by using past records and human intuition based on past data and memories by the previous day with support of a system owned by the cafeteria operating company, secures necessary ingredients, and instructs subordinate cooks to prepare the ingredients and start cooking the menu items in accordance with predicted necessary quantities. However, once the cafeteria opens on an operational day, from moment to moment, the person in charge determines, mostly on intuition, how much prediction quantities of menu items as final decision by the person in charge differ from the actual orders from visitors, revises predictions up to a final state at the closing time on intuition, and adjusts order placement quantities for the subsequent time period. In other words, the reality is that the operation relies mostly on human intuition.

In a specific "closed organization" such as a company or a school, a "cafeteria operating under a closed environment", such as a cooperate cafeteria or a student cafeteria has a characteristic that employees or students as members of the closed organization customarily eat almost daily, and also has a characteristic that the same individuals eat almost daily. However, conventional predicting systems, which are becoming widespread in the food service industry, have a completely different characteristic that they are typically used in restaurants and the like where it is rare for the same individuals to visit two days in a row. In other words, the conventional systems are designed for people who visit substantially only once. Thus, the conventional systems have no functions to predict the behavior of each person or each attribute with focus on data such as the attributes of each individual eating member nor functions to make predictions for the entire cafeteria by summing predictions of the behavior of each person or each attribute based on data of the person.

The conventional systems may be able to predict the number of visitors and the number of placed orders for each menu item in a cafeteria under a "closed environment", depending on settings of parameters and functions, but do not record the behaviors and eating data of individual members nor have a function to predict for each individual member or attribute, and cannot solve problems of a cafeteria where individuals daily repeatedly visit in a concentrated manner at extremely limited and fixed times.

The following form is currently common in operation of a "cafeteria under a closed environment", such as a cooperate cafeteria of a company and a student cafeteria, where members of a specific "closed organization" daily eat. For example, the head chef makes order prediction for the menu before the cafeteria opens, prior to 12:00. Then, initial cooking (production) quantities are prepared based on this initial prediction quantities. Visitors begin visiting from 12:00 and a significant number of people visit by 12:15. At that point, order placement quantities until the cafeteria ends around 13:30 are reviewed again based on human intuition, and final cooking quantities are determined during the operation time of the cafeteria. These dynamic adjustment of order placement quantities often rely on the head chef, in other words, human intuition based on past experience. Alternatively, some conventional systems owned by the cafeteria operating company have functions to use AI to predict the number of visitors before the cafeteria opens, and further, to predict how much of a specific menu item (meal) will be ordered based on past data. However, such conventional systems are not only unlinked with order receiving systems (for example, cafeteria cash registers) but also lack functions to observe or record the behaviors of individual persons. Thus, for example, in a case where the cafeteria opens at 12:00 as described above, there is no function to revise overall predictions for the subsequent order placement status and the total number of orders until the cafeteria closes, based on the number of visitors and the order status of a specific menu by 12:15, while considering the visiting times of individual persons and the status of ordered menu items. With the conventional systems, the only way to adjust determination of whether difference from initial prediction quantities occurs is through human intuition, and there was no technology to correct the determination. To have technologies of mid-course correction, new technologies different from conventional technologies are absolutely necessary, but even if mid-course correction using existing technologies is possible, conventional technologies have no functions linked with an order receiving system (for example, a cafeteria cash register), and thus it is not possible to perform mathematical and statistical analysis constantly using real-time data of the behaviors of specific individuals and groups having specific attributes. In other words, prediction of order placement quantities needs to be corrected from moment to moment through processing with AI functions, but conventional technologies do not have such fundamental technologies nor functions.

The present disclosure takes into account the unique characteristics of a high-volume supply cafeteria under a "closed environment" in a "closed organization", and further, in view of prediction values before the cafeteria starts and real-time data of individual members and groups with specific attributes, which is obtained from the cafeteria cash register from moment to moment, such as visitor data and order placement data received from the order receiving system up to a certain time point, for example, 12:15 after elapse of time, considers importance of prediction of final prediction and mid-course order placement curve again at the time point by comparing and recognizing the difference between actual values up to the time point and prior prediction values. Conversely, without discussion of the "importance", the necessity of the present disclosure would not be recognized at all.

The above-described "importance" will be described below in more detail. First, a high-volume supply cafeteria under a "closed environment" is a place where an extremely large number of people such as 1000 or 2000 visit and where members of a specific closed organization daily eat. Then, during lunch time, for example, the members visit in a concentrated manner between 12:00 to 13:00. Furthermore, they visit in a concentrated manner during an extremely short specific time of 12:00 to 12:15. The primarily assumption discussed in the present disclosure is that such a large number of people visit in a concentrated manner during a specific time. The degree of concentration far exceeds that of a typical large-sized restaurant. Unlike typical restaurants, visitors arrive with an exceptionally high degree of concentration during an extremely short time, it is normal for them to visit with overwhelming density, and they have unique characteristics as discussed in the present disclosure, and because of the unique characteristics, it is necessary to adjust not only prior predictions but also predictions of the number of visitors and the number of placed orders in the remaining time until the cafeteria closes based on the number of visitors and the number of placed orders, which change from moment to moment through the order receiving system (for example, cafeteria cash register) since the cafeteria opens, and further, based on data related to individual members.

In addition, the place has a characteristic that the visitors are the same kind of members who customarily visit and consume food and beverages daily at a workplace such as a company or a factory, and a student cafeteria on a university campus. Thus, as compared to predictions for typical restaurants where a large unspecified number of people visit and consume food and beverages, because of a place where specific individuals repeatedly visit and consume food and beverages, more accurate order predictions than with typical visitor expectation systems can be made with predictions performed before opening based on past various kinds of data. However, the conventional predicting system of a cafeteria operator has no data for specific individuals and specific groups nor such functions.

For members who visit with overwhelming density, a "preparation program" is usually designed, the program including preparing a certain amount of each menu by a particular time before opening, preparing ingredients in advance (such as cutting vegetables and meat), starting to stir-fry by a particular time, and plating dishes by a particular time. However, the unique characteristic of a high-volume supply cafeteria under a "closed environment" lies in that the total number of orders to be prepared is an enormous number ranging from several hundreds to several thousands. There is a characteristic that people visit with exceptionally higher time density and orders are placed in an exceptionally different manner as compared to typical restaurants. Thus, if there is a discrepancy between prior predictions and resulting order placement quantities, for example, it causes significant financial damage to the cafeteria operating company. Importance of the discrepancy between demand predictions for a high-volume supply cafeteria under a "closed environment" and actual quantities lies in that failing to accurately predict order placement for each menu item potentially results in an enormous discrepancy of several hundreds. Furthermore, since the difference between prior prediction quantities and actual quantities is enormous, order predictions need to be corrected from moment to moment in accordance with the operating status of the cafeteria after the cafeteria opens, which is a unique situation to a high-volume supply cafeteria under a "closed environment".

In a case of a high-volume supply cafeteria under a "closed environment" in a "closed organization", the owner of the cafeteria is typically the "closed organization" itself, in other words, a company or an educational institution such as a university. The "cafeteria operating company" of the cafeteria is obligated to provide meals as a service in accordance with contracts with the "closed organization". Such a "cafeteria operating company" is called a "contract food service provider". In other words, a company or an educational institution is the entrustor, entrusting the cafeteria operating company as the contractor under a service contract of providing meals on agreed terms. This "service contract" is often supported by the entrustor in the form of subsidies within a budget, and there is an obligation to provide as comprehensive a menu as possible at inexpensive and reasonable prices to company employees or students as members and provide food and beverages with which employees or students as users of a company or an educational institution as the entrustor are satisfied daily. In other words, the cafeteria operator as the contractor is obligated to continuously provide satisfactory meals as efficiently as possible within a limited budget. Under relatively strict economic conditions, in other words, within a limited budget, it is necessary to provide a menu with which users are satisfied as much as possible. Thus, in a high-volume supply cafeteria under a "closed environment", where an enormous number of users visit in a concentrated manner during a limited time and consume food and beverages in a concentrated manner as described above, it is not sufficient to focus on "safety measures" such as preparing meals with allowance in advance and preparing a larger number of meals for convenience, but rather, economic reasonableness is extremely important that it is necessary to minimize waste as much as possible and it is desirable that prior predictions match with actual quantities as closely as possible.

In a case where excessive "safety measures" are taken or in a case where prediction quantities before the cafeteria opens are overestimated, prepared ingredients or completed dishes are potentially wasted as a result. Without as accurate predictions as possible, if there is a large difference between prediction quantities and actual order placement quantities, "losses" occur in large units as a result. In particular, completed dishes and ingredients prepared in states at final cooking stages right before cooking such as heating or boiling need to be discarded almost always if they remain at the time when the cafeteria closes. In a case where the amount of waste is high, profitability degrades, a profit generated by the contractor from tasks under the service contract, which is calculated by subtracting costs on the contractor from a money amount (subsidies or grants) allowed from the entrustor, is reduced by costs along with the waste. According to the past history, it is common that this service contract is significantly financially strict for the cafeteria operator as the contractor, and the profit is largely reduced in a case where the amount of waste is high. According to actual data, it is said that if the amount of waste exceeds 10%, it results in a significant deficit. For example, in a case where 300 meals are predicted for a menu item and prepared before opening but the actual order placement quantity is 270 meals, an amount to be discarded is 30 meals, and it is said that the profit for the cafeteria operator as the contractor is significantly reduced to a deficit. Thus, the difference between a prior prediction quantity and the actual order placement quantity is preferably as small as possible, and as a general operation guideline, it is desirable that the difference should be equal to or smaller than 5%. Specifically, in the above-described example, if 300 meals are predicted, it is desirable that actual order placement should be about 285 meals.

On the other hand, there is an idea that preparing just the minimum order placement quantity would be sufficient. For example, there is the probability of an idea that cooking should be done after orders are placed. However, there are significant risks unique to a high-volume supply cafeteria under a "closed environment" in a "closed organization". As described above, a high-volume supply cafeteria under a "closed environment" in a "closed organization" is a place where a high volume of specific employees or students visit all at once within a limited timeframe. It can be said that there are no other place where such a large number of people regularly or customarily visit almost every day, repeatedly using the place. Moreover, lunchtime is an important break time for employees and students and is a welfare time for employees to rest and recharge and also a biologically essential time to supply nutrition, water, and energy to the bodies of employees through meals, and a cafeteria is an important life activity place where food and beverages are consumed. Furthermore, its recognition has recently evolved far beyond just a place to have meals, and the place provides a valuable time with meanings of recreation where employees or students communicate, relax, exchange information, and enjoy a cheerful and pleasant time. Thus, the time should be extremely effectively used and desirably comfortable. Accordingly, the idea that cooking should be done after orders are placed is not very appropriate. There are cases where waiting is acceptable and cases where it is not, and this is deeply related to the operational policy and philosophy of the cafeteria. However, in a high-volume supply cafeteria under a "closed environment" in a "closed organization", it is common and desirable that an allowable waiting time is short.

On the other hand, there is an idea that "it is better to serve freshly prepared meals as much as possible". Even in a high-volume supply cafeteria under a "closed environment", it is not ideal that all menu items are already cooked in advance and already placed on dishes. This is indeed one important expertise of cafeteria operators and lies in combination of dishes that "(a) are already prepared and displayed, (b) require an extremely short cooking time, (c) require a moderate cooking time, and (d) require a long cooking time". The balance between (a) to (d) is deeply related with the concept and philosophy of the entrustor, for example, a company or an educational institution such as a university, toward cafeteria operations, where the cafeteria operator as the contractor applies its uniqueness to some extent based on expertise, technologies, and its philosophy and concept while aligning with the concept and philosophy of the entrustor on what the cafeteria should be, and it cannot be definitively said that all dishes to be provided in such a high-volume supply cafeteria under a "closed environment" should be prepared as in (a). However, considering the unique characteristics of a high-volume supply cafeteria under a "closed environment" as described above, it is clear that it is desirable that meals are provided as immediately as possible without waiting, in other words, (a) and (b). Additionally, meals like (c) and (d) are intentionally or strategically provided in part to add variety to the operation of the closed cafeteria or provide a fresh non-routine experience for members of the closed environment as users in some cases. However, shortening waiting time as much as possible and providing meals without dissatisfaction regarding time is one of important unique characteristics related to the operation of a high-volume supply cafeteria under a "closed environment" in a "closed organization", and compared to waiting time allowed in typical restaurants or waiting time for general public expectations, it is generally desirable and reasonable to provide meals in a further shorter time. For example, it is common sense that time significantly shorter than time required from order placement, payment, and waiting at a receiving place to reception of ordered food and beverages in a burger restaurant as a typical fast food restaurant is requested for a high-volume supply cafeteria under a "closed environment".

What is being taken more seriously than the problem with profitability of cafeteria operators is "zero waste" requirement by SDGs. As described above, excessive waste squeezes the profit of a cafeteria operator, degrades profitability, and leads to financial difficulties. The problem is not resolved even if the cafeteria operator endures financial strain and accepts low profitability, for example, when there is a significant difference between prior prediction values and the actual numbers of visitors and placed orders, resulting in a large actual amount of waste. Current public awareness and social demands tend to extremely prioritize "SDGs", and "excessive waste" is seen as causing serious problems, being regarded more seriously than before. "Waste" is largely affecting not only the cafeteria operator but also a company or school as a "closed organization" that is the cafeteria owner of the cafeteria under a closed environment. In other words, the fact that a company or a school includes a cafeteria with "excessive waste" is increasingly being regarded as a sign that the organization has serious problems of "SDGs". This problem is that not only the cafeteria operator but also the "closed organization" as the operating entity, for example, a company or school as the owner of the cafeteria tend to extremely prioritize "zero waste". The more the "closed organization" as the operating entity prioritize SDGs and "zero waste" in this manner, the stronger the need for the cafeteria operator to promote "zero waste" in the cafeteria that it manages along the priority. In this context, in a case where convenience is primarily focused so that meals are immediately available, and prediction quantities are overestimated and preparation is made with allowance, resulting in excessive pre-cooking of menu items or over-preparation of ingredients, a significant number of items are potentially wasted if the actual number of orders is far smaller than a prediction quantity. To prevent this, enhance convenience, and improve the quality of service in the cafeteria, it is preferable to make prior predictions as accurate as possible and it is important to make swift and accurate correction predictions of prediction quantities in real time, in accordance with the actual visitor and ordering situation after opening, from that time point until closing, and the present discloser has thought that a predicting system with functions for fulfilling such purposes is needed.

An AI predicting system only with prior predictions has no functions to adjust, correct, and continuously output predictions of the number of visitors and menu orders in real time until closing while receiving actual data of visitors from an order receiving system (for example, cafeteria cash register) in real time after the cafeteria actually opens. Currently typical operation is such that operation is started in accordance with initial prior predictions only, determination is typically made through human intuition of the head chef in a case where the number of visitors and the number of placed orders are smaller than prediction quantities, and quantities predicted in advance by using a predicting system are adjusted with human intuition again, and thus, the operation still relies on human intuition.

In a cafeteria that provides an eating service in a "closed organization", users are individuals at a limited place, and if they are the same individuals, it is customary for them to visit around a specific time during one-hour lunch break, for example, and thus the present discloser thought that, by accurately tracking data of individual persons and knowing in advance the probability that a specific individual will visit the cafeteria around a specific time during one-hour lunch break, it is possible to significantly accurately predict the time of visit to the cafeteria for the number of visitors or the number of visitors in a specific group for all individuals belonging to an organization under a "closed environment", such as a specific group of employees or students, as the sum of probabilities of employees. At present, existing predictions of the number of visitors or menu sales in a "cafeteria under a closed environment" have no functions to record the behaviors of specific individual persons or a specific group for a long duration, effectively utilize the data, produce various models, and correct the models by learning.

In this manner, it is one objective of the present disclosure to simultaneously achieve zero waste and service improvement.

Furthermore, conventional technologies have no functions to link a cafeteria cash register with a calculating unit that calculates prior predictions, utilize data recorded for individual persons based on the link, and adjust predictions of the number of visitors and the number of placed menu orders during the remaining time in real time, and can make only predictions before the cafeteria opens.

Even with other conventional systems, it is possible to predict the number of visitors and best-selling items on the day based on a specific schedule, day of the week, season, and the like and predict the quantity of placed menu orders by machine learning or the like. However, such conventional systems have no functions to predict supply and demand of a high-volume supply cafeteria under a "closed environment" in a "closed organization" for ordered menu contents and their order placement quantities in accordance with continuously changing time based on real-time data obtained from an order receiving system (for example, cafeteria cash register) and behavior predictions of individual members, and cannot make predictions of a large number of people and a large number of orders for the cafeteria in real time.

Conventional systems did not focus on individual members nor "had AI functions for predicting and determining the number of menu orders in real time to predict order placement quantities during the remaining cafeteria operation time at 12:15, for example", but were systems that support predictions of sales of a specific date in a specific season for the entire cafeteria based on past data.

Furthermore, "menu sales expectation systems" currently used by such a cafeteria operating company do not have data of individual members and specific groups as described above nor have functions to link with cafeteria cash registers that such members daily use for payment. Thus, while the systems predict sales for the entire cafeteria in advance, they have no functions to focus on individual persons, measuring and predicting the probability of what and when individual members and specific groups eat, nor functions to understand data of when and what the members visit and order in real time since they are not linked with cafeteria cash registers. Accordingly, in such systems currently used by the cafeteria operating company, the numbers of visitors and menu orders for the entire cafeteria are determined based on human judgement by the head chef or the like, and the systems had no functions to receive the behaviors of individual members from cafeteria cash registers in real time, correct the difference from predictions based on the behaviors in real time, and adjust the number of prepared menu items for the entire cafeteria in real time.

Recently, AI technologies have developed and mechanisms for predicting future events in real time even when prior data is insufficient have become increasingly sophisticated. Conventional menu sales predictions used by cafeteria operators are based on past eating data of a large number of cafeterias, predicting the relation between weather, season, and other factors and various menu order predictions with Pearson correlation coefficients or the like. However, this is largely based on the idea of conventional probabilistic theory and not based on, for example, "Bayesian inference", which fundamentally calculates subsequent probabilities based on the changing behaviors of individuals in various manners and real events. One of main AI computational processing, which has been recently developing, is based on "Bayesian inference", which recalculates the probabilities of future events that change in real time. Conventionally, in such a "high-volume supply cafeteria under a closed environment" in a "closed cafeteria", no functions have been available to consider various factors, acquire data related to continuously ordered menu items by visitors in real time in coordination with cafeteria cash registers or the like, perform processing by a Bayesian statistical method in real time on "prior predictions" as prior distributions produced in advance based on AI from various kinds of data before opening based on the data, and newly produce "order predictions" as posterior distributions as "Bayesian updating".

In various kinds of cafeterias where a large number of people as members of the "closed organization" visit all at once and consume food and beverages, like cafeterias tasked with a mission of supplying a large number of meals to a large number of visitors during a limited time, such as cooperate cafeterias and student cafeterias under a "closed environment" in what is called a "closed organization" such as a company or a school, it is extremely important to assume the number of placed orders of each menu item in advance and predict the number of serves of the menu item in accordance with time. Existing technologies include systems (including computer systems that perform prediction calculation based on hypotheses) that performs AI calculation that supports predictions as the total quantity of a menu item beforehand in a high-volume supply cafeteria under a "closed environment", but cannot analyze individual members, and there have been no systems with functions to continuously predict and display an appropriate value for the quantity of meals of the menu item to be prepared and actually cooked in accordance with the numbers of visitors and orders continuously changing over time. There are various systems that predict the quantities of all menu items served in a cafeteria and times at which they are served in association, but correction and determination of appropriate quantities in real time while continuously observing a situation in which visitors actually visit and place orders largely rely on human intuition of the head chef. Even though existing technologies include systems that analyze the number of menu items served in the entire cafeteria, but the systems cannot predict a visiting time to the cafeteria for individual persons based on data related to the attribute, preferences, and past behavior of each member, and have no function to predict ordered menu items based on preferences. Furthermore, predictions of the quantities of visitors and orders in the entire cafeteria by existing systems are predictions for the entire cafeteria, but not integration of behavior predictions of individual members.

[Order Quantity Predicting System and the Like of the Present Disclosure]

According to an aspect of the present disclosure, an order quantity predicting system for a cafeteria is provided, the order quantity predicting system including a past order history database, an external factor database, an order pattern model generating unit, an order quantity prediction calculating unit, and an order quantity update calculating unit, in which the past order history database configured to store a past order history in the cafeteria for each user in association with attribute information of the user and the chronological sequence, the external factor database configured to store any information except for the order history in association with the chronological sequence, the order pattern model generating unit configured to generate an order pattern model for each user along the chronological sequence, an order pattern model for each attribute along the chronological sequence, and/or an order pattern model for the entire cafeteria along the chronological sequence based on information stored in the past order history database and information stored in the external factor database, the order quantity prediction calculating unit configured to (1) calculate an order prediction model for each user along the chronological sequence of a specific date based on an order pattern model for each user, a menu of the specific date, and information related to the specific date and stored in the external factor database, and calculate an order prediction model for the entire cafeteria along the chronological sequence of the specific date based on the sum of the order prediction model for each user, (2) calculate an order prediction model for each attribute along the chronological sequence of a specific date based on the order pattern model for each attribute, a menu of the specific date, and information related to the specific date and stored in the external factor database, and calculate an order prediction model for the entire cafeteria along the chronological sequence of the specific date based on the sum of the order prediction model for each attribute, and/or (3) calculate an order prediction model for the entire cafeteria along the chronological sequence of a specific date based on the order pattern model for the entire cafeteria, a menu of the specific date, and information related to the specific date and stored in the external factor database, and the order quantity update calculating unit configured to (1) calculate an updated order prediction model for each user along the chronological sequence, which is obtained by updating the order prediction model for each user by a Bayesian statistical method based on an actual order history of a specific date for each user, and calculate an updated order prediction model for the entire cafeteria along the chronological sequence of the specific date based on the updated order prediction model for each user, (2) calculate an updated order prediction model for each attribute along the chronological sequence, which is obtained by updating the order prediction model for each attribute by a Bayesian statistical method based on an actual order history of a specific date for each user, and calculate an updated order prediction model for the entire cafeteria along the chronological sequence of the specific date based on the updated order prediction model for each attribute, and/or (3) calculate an updated order prediction model for the entire cafeteria along the chronological sequence of the specific date, which is obtained by updating the order prediction model for the entire cafeteria by a Bayesian statistical method based on an actual order history of a specific date for each user.

According to another aspect of the present disclosure, a cafeteria order system is provided, the cafeteria order system including:

the order quantity predicting system;

an order receiving system configured to transmit an actual order history of a specific date for each user to the order quantity predicting system; and a display system configured to display the order prediction model for the entire cafeteria and/or the updated order prediction model for the entire cafeteria.

According to an aspect of the present disclosure, even in a high-volume supply cafeteria under a "closed environment" in a "closed organization", predictions are performed based on data of individual members, and thus the accuracy of visiting time predictions, time-specific and menu-specific order predictions, and visitor and order predictions for the entire cafeteria can be significantly improved, and it is advantageous in that the accuracy of expected amounts based on order placement predictions can be significantly improved. According to an aspect of the present disclosure, it is advantageous in that order quantities can be predicted in cafeterias with such a special characteristic that a large number of people as regular members customarily and regularly consume food and beverages (for example, almost every day), and further, visit in a concentrated manner during a limited time and eat in a concentrated manner.

According to an aspect of the present disclosure, by performing analysis in accordance with the chronological sequence based on the real-time visiting and ordering statuses of individual members, which can be obtained by cafeteria cash registers, and data of external factors such as weather conditions, it is possible to predict cooking quantities, the amounts of necessary ingredients to be prepared, and the like in real time in accordance with optimum menu selection and its cooking amount and time and present them to the entire kitchen and chefs and staffs including the head chef. In particular, according to an aspect of the present disclosure, in a cafeteria under a "closed environment", where the same members customarily visit every day, such as a cooperate cafeteria or a student cafeteria, habits and preferences of individual members unique to the closed environment are considered, and in an extremely limited cafeteria where a large number of people consume food and drink all at once within a limited time, which is unique to consuming food and drink in the closed environment, optimum quantities to be prepared in the entire cafeteria are predicted in real time based on habits and data of individual persons and based on data associated with the individual persons, such as actual visiting times and ordered menu items of the individual persons on the day, and it is possible to avoid producing unnecessary meals, prevent waste due to excessive preparation, timely provide dishes, avoid cooling of dishes due to preparation in advance, and/or increase satisfaction of the cafeteria by visitors, which are advantageous.

According to an aspect of the present disclosure, when individual members will visit the cafeteria can be roughly predicted based on past data, and similarly, which characteristics, kinds, and attributes of menu items are likely to be ordered can be predicted based on the order placement history, which are advantageous. In addition, according to an aspect of the present disclosure, correctness of predictions performed for individual members can be daily improved by using functions including box plot analysis and Pearson correlation coefficient calculations, which is advantageous. According to the present disclosure, for example, in accordance with external factors (for example, weather data), dishes to be actually ordered and their order times in the future under influence of such external factors can be predicted with a certain probability based on the past history of individual persons like tendencies to eat food A on sunny days and eat food B on cold days, and further, correctness of the probability can be improved, which are advantageous.

According to an aspect of the present disclosure, even if orders are predicted, once the cafeteria actually opens and a large number of visitors visit and order what they want, it is possible that the actual numbers of visitors and orders of each menu item over time become different from prior predictions, but in this case, comparison can be performed in real time between prediction quantities and changing data in real time, which is acquired from an order receiving system (for example, cafeteria cash register) in real time, in other words, data of the actual visiting and ordering contents of members, which is acquired from the cafeteria cash register, and this is advantageous. In other words, according to the present disclosure, processing is performed based on a Bayesian statistical method so that subsequently occurring events can be predicted again by the Bayesian statistical method, which is advantageous. Thus, according to the present disclosure, there is no need to rigidly adhere to prior order predictions produced before the cafeteria opens and continue preparing specific menu items until the end of the opening hours, and the head chef can appropriately prepare the menu in accordance with constantly changing final quantities or necessary estimates for interim time while monitoring a display displaying order predictions that continuously change and newly corrected based on Bayesian updating or the like, which are advantageous. Accordingly, the difference from the definitive final number of placed orders at the closing time of the cafeteria can be minimized, and thus the amount of waste in the cafeteria can be minimized or reduced close to zero, which is particularly advantageous.

According to an aspect of the present disclosure, it is based on predicting daily visiting times, ordered menu items, and the like for individual persons based on data related to what is called "habits" and "preferences" irrespective of intention of individual persons, which is obtained through observation and recording for a long duration, and utilizing data obtained in real time in coordination with cafeteria cash registers, and thus predictions for the entire cafeteria can be performed at accuracy higher than with conventional predicting systems, which is advantageous. In other words, predictions by a large number of cafeteria operating companies utilizing conventional technologies are the above-described predictions of the numbers of visitors and ordered menu items as a whole in the cafeteria and have no functions to perform predictions for individual members, but according to the present disclosure, data of individual persons can be acquired from a linked order receiving system (for example, cafeteria cash register), and thus data such as habits of individual persons can generated, calculated, or recorded from various angles, which is advantageous.

According to an aspect of the present disclosure, the behavior of each member in the cafeteria can be predicted at extremely high accuracy based on data as habits of the member, which is advantageous. According to an aspect of the present disclosure, for example, in a case where it is understood beforehand in the present disclosure that a member customarily visits the cafeteria around 12:15 and the person is highly likely to order hot noodles on cold days, it is possible to predict the eating behavior of the member in the cafeteria on a certain day by applying external factors, such as weather on the day and the day of the week, and rules, which is advantageous.

According to an aspect of the present disclosure, it is possible to take into consideration the habits and preferences of each member, and moreover, it is possible to efficiently use data recorded as the habits of the member, including preferences and nutrition imbalance, such as whether the member eats at breakfast around 10:00, customarily visits around 11:30 right before the cafeteria opens, often visits around 11:45, or customarily visits after 12:30 following the peak and whether the member habitually (customarily) eats ramen at least once a week, customarily eats a daily salad, eats a large amount of carbohydrates, or eats meat but never eats fish, which are advantageous. In addition, according to an aspect of the present disclosure, it is possible to utilize data in accordance with the behavior difference in accordance with various groups in a company. Specifically, for example, in a company, P division defines its lunch time from 11:30 to 12:30, Q division defines its lunch time from 12:15 to 13:15, and R division defines its lunch time from 12:30 to 13:30 according to regulations of the company, and it is possible to also utilize data in accordance with the behavior difference among the groups, which is advantageous.

According to an aspect of the present disclosure, since the above-described data is available for all members belonging to the closed environment and the above-described prediction is possible, it is possible to predict, as the sums of the data, the numbers of visitors and placed orders for each menu item in the entire cafeteria in real time at higher accuracy, which is advantageous. Thus, according to an aspect of the present disclosure, it is possible to perform predictions in a form far accurate and close to the reality as compared to predictions by existing technologies, which perform calculation and prediction as a whole without focusing on individual persons, which is advantageous. In other words, according to an aspect of the present disclosure, it is possible to focus on members of an organization under a closed environment, apply the correlation between different types of data, machine learning, or the like to the individual members based on data of the individual members for a long duration, and determine the relation between the data, and thus prediction values for the individual persons can be brought closer to the reality, and the accuracy of a prediction value for the entire cafeteria as the sum of the prediction values can be increased, which is particularly advantageous.

According to a preferable aspect of the present disclosure, the order quantity update calculating unit is configured to perform at least two (preferably, three) calculations selected from a group consisting of (1) to (3) described below:

(1) calculating an updated order prediction model for each user along the chronological sequence, which is obtained by updating the order prediction model for each user by a Bayesian statistical method based on an actual order history of a specific date for each user, and calculating an updated order prediction model for the entire cafeteria along the chronological sequence of the specific date based on the updated order prediction model for each user, (2) calculating an updated order prediction model for each attribute along the chronological sequence, which is obtained by updating the order prediction model for each attribute by a Bayesian statistical method based on an actual order history of a specific date for each user, and calculating an updated order prediction model for the entire cafeteria along the chronological sequence of the specific date based on the updated order prediction model for each attribute, and/or (3) calculating an updated order prediction model for the entire cafeteria along the chronological sequence of a specific date, which is obtained by updating the order prediction model for the entire cafeteria by a Bayesian statistical method based on an actual order history of the specific date for each user.

In this manner, since the order quantity update calculating unit performs two (preferably, three) calculations, the order prediction model for the entire cafeteria of a specific date is calculated with each calculation weighted. Thus, it is possible to calculate an order prediction model that is further convenient for the cafeteria by changing weighting among a case where calculation is performed by a method based on Bayesian statistics (for example, Bayesian inference) with focus on individual persons, a case where calculation is performed by a method based on Bayesian statistics with focus on attributes (such as sex, age, and belonging organization), and a case where calculation is performed by a method based on Bayesian statistics for the entire cafeteria, and this is particularly advantageous.

For example, in a case where only P factory is closed in a company, weighting of (B) is increased with focus only on the attributes of employees belonging to P factory so that the order prediction model for the entire cafeteria can be swiftly and accurately calculated with a reduced calculation amount, and for example, in a case where massive calamities and disasters far beyond the ranges of individuals and attributes have occurred, in other words, in a case where a situation that significantly largely affects the operation of the entire cafeteria irrespective of individuals and attributes has occurred, (Y) is significantly largely weighted so that the calculation amount can be significantly reduced and the order prediction model for the entire cafeteria can be swiftly and accurately calculated, and these are particularly advantageous.

According to an aspect of the present disclosure, it is possible to daily change Pearson correlation coefficient values for various kinds of data and/or it is possible to daily update the accuracy of box plot analysis, and thus an order pattern model when, for example, functions are calculated based on the updated new accuracy can be enhanced by machine learning or the like, which is advantageous. Moreover, according to an aspect of the present disclosure, the order pattern model enhanced in this manner can be stored in, for example, an order pattern model database, which is advantageous. In other words, according to an aspect of the present disclosure, the accuracy of prediction in the closed cafeteria improves over time as the amount of data used for learning increases, and thus the accuracy of prediction can be daily enhanced, which is particularly advantageous.

An aspect of the present disclosure has a characteristic of being linked with an order receiving system (for example, cafeteria cash register) and has functions with which each time company employees or students who are specific members of a company or university as a "closed organization" daily pass through the cafeteria cash register on a given day, data related to the time when they visited the cafeteria on the day, the time when they placed orders, and what they ate (what they ordered) can be acquired daily, and these are advantageous. According to an aspect of the present disclosure, with the functions, correction values calculated in real time by a Bayesian statistical method can be calculated based on order prediction quantities for each time point produced before the cafeteria opens and data newly acquired in real time, which is the visit time (order placement time) and the menu items ordered by each member through the cafeteria cash register after the cafeteria opens, which is advantageous. In other words, according to an aspect of the present disclosure, in a high-volume supply cafeteria under a "closed environment", it is possible to obtain data on who entered the cafeteria and what they ordered by, for example, 12:15, and based on such data of the specific time and menu order contents for each member, it is possible to constantly revise predictions for a final outcome as the definitive total number of each menu item up to the closing time around 13:30, which is advantageous. Accordingly, prediction values produced by conventional technologies before opening can be reviewed during the cafeteria's operation, resulting in highly accurate prediction values each time, and thus there is no need to prepare unnecessary ingredients and it is possible to approach zero waste, which is advantageous.

An aspect of the order quantity predicting system of the present disclosure will be described below in detail with reference to the accompanying drawings. Note that the order quantity predicting system of the present disclosure is not limited to the aspects of diagrams to be described later.

First, for example, in companies or universities, employees or students (users) as belonging members are substantially fixed in many cases. Although some individuals leave and new ones join daily, monthly, or yearly, the majority of members are fixed members in many cases. In such a place, the users are fixed or there may be some turnover, it is assumed that a large number of users are fixed for a certain duration. In this sense, the place is a "closed organization", and a cafeteria that primarily serves constant users in the organization can be referred to as a "closed organization's cafeteria". The present disclosure primarily targets the "closed organization's cafeteria" in the "closed organization", assuming what is called a cooperate cafeteria or a student cafeteria. Such a cafeteria is characterized that users of the organization gather to eat in a limited timeframe such as lunchtime, and thus is a "high-volume supply cafeteria in a closed organization" and the present disclosure primarily assumes an order quantity predicting system for such a cafeteria.

Users as members of what is called a "closed organization" regularly consume meals such as lunch under a "closed environment", mainly at lunchtime, on a daily basis. Under a "closed environment", where such members work or study, it is common that there is a cafeteria for supporting such activities and the cafeteria has a kitchen, where chefs work to provide meals primarily for members to eat and drink. The meals are provided by a cafeteria operator or the like that has entered into, for example, a service contract with the "closed organization" that manages the closed environment, such as a company or a university. In other words, "cafeteria operation under the closed environment" is based on a business arrangement with which the company or university acts as the entrustor, a selected cafeteria operator acts as the contractor, and the contractor provides meals to the entrustor.

A "closed organization" in the present disclosure means an organization to which specific members (in other words, users) belong. Typical examples of closed organizations include companies, public agencies, high school, universities. Note that closed organizations are also intended to include spaces (for example, shopping malls) where it is common to use cards or the like storing user attribute information, such as membership cards. A "closed environment" in the present disclosure means a place used by users belonging to a closed organization. A "closed cafeteria" in the present disclosure means a cafeteria where the majority of users are specific individuals. Typical examples of closed cafeterias include cafeterias in companies and cafeterias in universities and the like (for example, student cafeterias). Examples of "closed cafeterias" also include restaurants (for example, restaurants in shopping malls or the like (including food courts)) where it is common to order menu items by showing cards or the like storing user attribute information, such as membership cards.

"User" in the present disclosure is used interchangeably with "member" or similar terms.

"Attribute information" in the present disclosure means any user attribute information. The attribute information is not limited thereto but may include, for example, sex, age, date of birth, place of origin, name of an affiliated organization (for example, company name or school name), user identification information (for example, employee number or student number) in the affiliated organization, job position (for example, official position name), department (for example, group name in the organization, such as division or factory name and faculty name to which they belong), and employment status (for example, full-time or part-time).

In the present disclosure, for example, an order pattern model "for each attribute", an order prediction model "for each attribute", and an updated order prediction model "for each attribute" mean models generated or calculated for the attribute. "Attribute" in "for each attribute" is synonymous with the above-described attribute information. For example, in a case where "attribute" is sex, an order pattern model or the like for each sex (male or female) may be generated or calculated. In a case where "attribute" is job position, an order pattern model or the like for each job position (for example, general employee, manager, or executive) may be generated or calculated. In a case where "attribute" is department, an order pattern model or the like for each department (for example, department such as P division or Q division) may be generated or calculated.

[Configuration of Order Quantity Predicting System for Cafeteria]

An example of the order quantity predicting system of the present disclosure will be described below with reference to FIG. 1.

An order quantity predicting system 1 of the present disclosure includes at least a past order history database 101, an external factor database 102, an order pattern model generating unit 108, an order quantity prediction calculating unit 109, and an order quantity update calculating unit 110. The order quantity predicting system 1 may further include an order reservation database 103, a same-day order history database 104, an order pattern model database 105, an order prediction model database 106, an updated order prediction model database 107, and/or a correction parameter calculating unit 111. The order quantity predicting system 1 may include a communication unit 112, an input-output interface unit 113, and the like as appropriate.

(Past Order History Database)

The past order history database 101 is a database that stores, in association with the attribute information of a user belonging to a closed organization, a past order history for each user in a cafeteria of the organization.

The past order history database 101 may store, for example, data illustrated in FIG. 12 to be described later. In the example illustrated in FIG. 12, the attributes (for example, sex, age, official position, and department) of a user and past order information (order date and time, ordered menu items, calories and nutritional information of the menu items, and the like) for each user are stored. The past order history database 101 may freely set information to be stored in accordance with the policies, concepts, and philosophies of a "closed organization". Note that information related to the attributes of a user does not necessarily need to be stored in the past order history database but may be stored in another database or the like. In this case, a past order history stored in the past order history database and information related to the attributes of a user, which is stored in the other database or the like, may be associated by an identification code or the like.

(External Factor Database)

The external factor database 102 is a database that stores any information except for the above-described order history in association with the chronological sequence. Examples of information stored in the external factor database include weather information, disaster information (for example, earthquakes, typhoons, river flooding, and tsunamis), economic information (for example, foreign exchange information), traffic information (for example, congestion information and delay information), pandemics information, crisis information (for example, terrorism, civil unrest, missile attacks, and war), labor dispute information (for example, strikes), national or municipal event information (for example, local marathons and international sports competitions), and event information (for example, training only for P division, Q factory shutdowns, new employee training, women's training, management training, meetings of headquarters directors, training for general employees, annual shareholders' meetings, first day of work for new employees, and scheduled enrollment ceremony dates) in organizations (preferably, the above-described closed organization), and these may be used individually or in any combination of two or more. These pieces of information may be public information and may be set to be acquired into the external factor database 102 at any frequency (for example, every hour or every day). According to an aspect of the present disclosure, the external factor database is configured to store at least one selected from a group consisting of weather information and event information within an organization. According to a more preferable aspect of the present disclosure, the external factor database is configured to store weather information.

(Order Reservation Database)

The order reservation database 103 is a database that stores order reservation information of a specific date for each user. The order reservation database 103 can store the attribute information of a user and the order reservation information of the user of a specific date in association. The order reservation database 103 may store, for example, the order reservation information of a specific date, which is transmitted from a user terminal used by a user. The order reservation database 103 may store the order reservation information on a single specific date or may store the order reservation information on a plurality of specific dates. The order reservation database 103 may store, for example, information exemplarily illustrated in FIG. 17.

(Same-Day Order History Database)

The same-day order history database 104 is a database that stores actual order history on the same day of a specific date in association with the attribute information of a user. The order reservation database 104 may store, for example, information exemplarily illustrated in FIG. 22.

(Order Pattern Model Database)

The order pattern model database 105 is a database that stores an order pattern model for each user along the chronological sequence, an order pattern model for each attribute along the chronological sequence, and/or an order pattern model for the entire cafeteria along the chronological sequence, which are generated by the order pattern model generating unit 108 to be described later.

The order pattern model database 105 may store correction parameters calculated by the correction parameter calculating unit 111 to be described later.

(Order Prediction Model Database)

The order prediction model database 106 is a database that stores an order prediction model for each user along the chronological sequence of a specific date, an order prediction model for each attribute along the chronological sequence of a specific date, and/or an order prediction model for the entire cafeteria along the chronological sequence of a specific date, which are calculated by the order quantity prediction calculating unit 109 to be described later.

(Updated Order Prediction Model Database)

The updated order prediction model database 107 is a database that stores an updated order prediction model for each user along the chronological sequence of a specific date, an updated order prediction model for each attribute along the chronological sequence of a specific date, and/or an updated order prediction model for the entire cafeteria along the chronological sequence of a specific date, which are calculated by the order quantity update calculating unit 110 to be described later.

(Order Pattern Model Generating Unit)

The order pattern model generating unit 108 can generate an order pattern model for each user along the chronological sequence, an order pattern model for each attribute along the chronological sequence, and/or an order pattern model for the entire cafeteria along the chronological sequence based on information stored in the past order history database 101 and information stored in the external factor database 102.

The order pattern model generating unit 108 can generate the above-described order pattern models by, for example, regression analysis (for example, multiple regression analysis). Calculation by calculation software or the like, machine learning (for example, deep learning), and the like can be used for generation of the above-described order pattern models.

(Order Quantity Prediction Calculating Unit)

The order quantity prediction calculating unit 109 can calculate the order prediction model for each user along the chronological sequence of a specific date based on the order pattern model for each user, the menu of the specific date, and information related to the specific date and stored in the external factor database 102. Moreover, the order quantity prediction calculating unit 109 can calculate the order prediction model for the entire cafeteria along the chronological sequence of a specific date based on the sum of the order prediction model for each user.

The order quantity prediction calculating unit 109 can calculate the order prediction model for each attribute along the chronological sequence of a specific date based on the order pattern model for each attribute, the menu of the specific date, and information related to the specific date and stored in the external factor database 102. In addition, the order quantity prediction calculating unit 109 can calculate the order prediction model for the entire cafeteria along the chronological sequence of a specific date based on the sum of the order prediction model for each attribute.

The order quantity prediction calculating unit 109 can calculate the order prediction model for the entire cafeteria along the chronological sequence of a specific date based on the order pattern model for the entire cafeteria, the menu of a specific date, and information related to the specific date and stored in the external factor database 102.

The order quantity prediction calculating unit 109 may calculate each above-described order prediction model further based on the order reservation information for each user stored in the order reservation database 103 as necessary.

The order quantity prediction calculating unit 109 may calculate each above-described order prediction model further based on correction parameters calculated by the correction parameter calculating unit 111 to be described later as necessary.

The order quantity prediction calculating unit 109 can calculate each above-described order prediction model by, for example, machine learning (for example, deep learning) or the like.

(Order Quantity Update Calculating Unit)

The order quantity update calculating unit 110 can calculate an updated order prediction model for each user along the chronological sequence, which is obtained by updating the order prediction model for each user by a Bayesian statistical method based on the actual order history of a specific date for each user. In addition, the order quantity update calculating unit 110 can calculate an updated order prediction model for the entire cafeteria along the chronological sequence of a specific date based on the updated order prediction model for each user.

The order quantity update calculating unit 110 can calculate an updated order prediction model for each attribute along the chronological sequence, which is obtained by updating the order prediction model for each attribute by a Bayesian statistical method based on the actual order history of a specific date for each user. In addition, the order quantity update calculating unit 110 can calculate the updated order prediction model for the entire cafeteria along the chronological sequence of a specific date based on the updated order prediction model for each attribute.

The order quantity update calculating unit 110 can calculate the updated order prediction model for the entire cafeteria along the chronological sequence of a specific date, which is obtained by updating the order prediction model for the entire cafeteria by a Bayesian statistical method based on the actual order history of the specific date for each user.

"Bayesian statistical methods" in the present disclosure are not particularly limited as long as the methods are based on Bayesian statistics. Bayesian statistical methods may include, for example, Bayesian inference; state-space models (such as Kalman filters, extended Kalman filters, non-Gaussian filters, particle filters, and Bayesian structural time series models); time series recurrent neural network (RNN)-based models (such as simple RNN, LSTM, GRU, encoder-decoder models, bidirectional recurrent models); temporal fusion transformer (TFT) models; Prophet models; Bayesian dynamic linear models; Bass models; stochastic volatility models; Markov switching models; chaos analysis (for example, logistic maps), and other time series forecasting models based on Bayesian statistics. Note that Bayesian statistical methods are still being researched around the world, new methods are rapidly developed, various methods are being published daily, and these are intended to be included in the present disclosure. According to an aspect of the present disclosure, Bayesian statistical methods are Bayesian inference.

The order quantity update calculating unit 110 may calculate the updated order prediction models further based on information stored in the external factor database 102 and the order pattern models stored in the order pattern model database 105 as necessary.

The order quantity update calculating unit 110 can calculate each above-described updated order prediction model by, for example, machine learning (for example, deep learning) or the like.

(Correction Parameter Calculating Unit)

The correction parameter calculating unit 111 can calculate correction parameters used for correcting the order pattern model for each user, the order pattern model for each attribute, and/or the order pattern model for the entire cafeteria based on the updated order prediction model for the entire cafeteria and the actual order quantity for the entire cafeteria of a specific date.

The correction parameter calculating unit 111 can calculate the above-described correction parameters by, for example, machine learning (for example, deep learning) or the like.

(Communication Unit)

The communication unit 112 can mutually transmit and receive data and the like by wireless communication and/or wired communication through a communication network NW.

(Input-Output Interface Unit)

The input-output interface unit 113 is connected to an input unit 114 and/or an output unit 115 that are built in and/or externally connected, and can control the input unit 114 and/or the output unit 115 (note that the input unit 114 and the output unit 115 are omitted in FIG. 1). Examples of the input unit 114 include a keyboard, a mouse, and a microphone. Examples of the output unit 115 include a display, a monitor, and a speaker.

(Other)

The order quantity predicting system 1 may include functional blocks other than the above-described functional blocks as necessary. The order quantity predicting system 1 may include, for example, a database or the like that stores the menu of a specific date.

Note that FIG. 1 illustrates the example in which the above-described functional blocks are included in one calculation device (computer). In this case, one calculation device including the above-described functional blocks may configure the order quantity predicting system 1 in an aspect of the present disclosure. Alternatively, the above-described functional blocks may separately exist in two or more calculation devices, and these two or more calculation devices may be connected to one another to mutually perform communication therebetween through the communication network NW or the like. In this case, the above-described two or more calculation devices may constitute the order quantity predicting system 1 in an aspect of the present disclosure.

The order quantity predicting system 1 may be a stand-alone system or a cloud-based system.

The order quantity predicting system 1 may be capable of mutually transmitting and receiving data and the like with an order receiving system 2, a display system 3, and/or a user terminal 4 by wireless communication and/or wired communication through the communication network NW (FIG. 8).

[Processing Flow of Order Quantity Predicting System for Cafeteria]

An example of the processing flow of the order quantity predicting system will be described below with reference to FIG. 2.

Information (past order history) stored in the past order history database and information (external factor information) stored in the external factor database are input to the order pattern model generating unit (S101 and S102). Note that, in the example illustrated in FIG. 2, the external factor data is input after the information related to the past order history is input, but these may be input to the order pattern model generating unit in any order or the information related to the past order history and the external factor data may be simultaneously input to the order pattern model generating unit.

In the order pattern model generating unit, the order pattern model for each user along the chronological sequence, the order pattern model for each attribute along the chronological sequence, and/or the order pattern model for the entire cafeteria along the chronological sequence are generated (S103).

The order pattern model for each user along the chronological sequence, the order pattern model for each attribute along the chronological sequence, and/or the order pattern model for the entire cafeteria along the chronological sequence, which are generated as described above, menu information for a specific date, and the order reservation information are input to the order quantity prediction calculating unit (S104 and S105). Note that these pieces of information may be input in any order or simultaneously.

Based on these pieces of input information, the order quantity prediction calculating unit calculates the order prediction model for each user along the chronological sequence on the above-described specific date, the order prediction model for each attribute along the chronological sequence on the above-described specific date, and/or the order prediction model for the entire cafeteria along the chronological sequence on the above-described specific date (S106).

On the specific date, the order prediction model for each user along the chronological sequence on the above-described specific date, the order prediction model for each attribute along the chronological sequence of the above-described specific date and/or the order prediction model for the entire cafeteria along the chronological sequence on the above-described specific date, which are calculated as described above, the actual order history of the specific date for each user, and as necessary, the order pattern model for each user along the chronological sequence, the order pattern model for each attribute along the chronological sequence, and/or the order pattern model for the entire cafeteria along the chronological sequence are input to the order quantity update calculating unit (S107). Based on these pieces of input information, the order quantity update calculating unit calculates the updated order prediction model for each user along the chronological sequence, the updated order prediction model for each attribute along the chronological sequence, and/or the updated order prediction model for the entire cafeteria along the chronological sequence by a Bayesian statistical method (S108).

As necessary, the updated order prediction model for the entire cafeteria and the actual order quantity for the entire cafeteria of the specific date are input to the correction parameter calculating unit. Based on the input information, the correction parameter calculating unit may calculate correction parameters used for correcting the order pattern model for each user, the order pattern model for each attribute, and/or the order pattern model for the entire cafeteria (not illustrated). The above-described calculated correction parameters may be transmitted to and stored in, for example, the order pattern model database (not illustrated).

(Processing Flow of Order Pattern Model Generating Unit)

An example of the processing flow of the order pattern model generating unit will be described below in more detail with reference to FIG. 3.

The information related to the past order history stored in the past order history database and information (external factor data) stored in the external factor database are input to the order pattern model generating unit 108 (S201 and S202). Note that, in the example illustrated in FIG. 3, the external factor data is input after the information related to the past order history is input, but these may be input to the order pattern model generating unit 108 in any order or the information related to the past order history and the external factor data may be simultaneously input to the order pattern model generating unit 108.

The order pattern model generating unit 108 performs multiple regression analysis processing based on the above-described input information and generates the order pattern model for each user along the chronological sequence, the order pattern model for each attribute along the chronological sequence, and/or the order pattern model for the entire cafeteria along the chronological sequence (S203 and S204). Note that results obtained through the multiple regression analysis processing as described above may be transmitted to and stored in, for example, any storage unit or database included in the order quantity predicting system as necessary. The above-described generated order pattern models may be transmitted to and stored in the order pattern model database included in the order quantity predicting system as necessary.

(Processing Flow of Order Quantity Prediction Calculating Unit)

An example of the processing flow of the order quantity prediction calculating unit will be described below in more detail with reference to FIG. 4.

The above-described order pattern models generated by the order pattern model generating unit 108 or stored in the order pattern model database, the menu of a specific date, and as necessary, the order reservation information and the external factor information are input to the order quantity prediction calculating unit 109 (S301 to S304). Note that, in the example illustrated in FIG. 4, the order pattern models are input first, but these may be input to the order quantity prediction calculating unit 109 in any order or these may be all simultaneously input to the order quantity prediction calculating unit 109.

Based on the above-described input information, the order quantity prediction calculating unit 109 calculates the order prediction model for each user along the chronological sequence of the above-described specific date, the order prediction model for each attribute along the chronological sequence of the above-described specific date, and/or the order prediction model for the entire cafeteria along the chronological sequence of the above-described specific date (S305). Specifically, in a case of having calculated the order prediction model for each user along the chronological sequence of the above-described specific date, the order quantity prediction calculating unit 109 calculates the order prediction model for the entire cafeteria along the chronological sequence of the above-described specific date based on the sum of the calculated order prediction model for each user (S305). In a case of having calculated the order prediction model for each attribute along the chronological sequence of the above-described specific date, the order quantity prediction calculating unit 109 calculates the order prediction model for the entire cafeteria along the chronological sequence of the above-described specific date based on the sum of the calculated order prediction model for each attribute (S305). Each calculated above-described order prediction model may be transmitted to and stored in the order prediction model database included in the order quantity predicting system as necessary.

The order quantity prediction calculating unit 109 may repeatedly perform the calculation of each above-described order prediction model at any frequency as necessary until the specific date arrives.

(Processing Flow of Order Quantity Update Calculating Unit)

An example of the processing flow of the order quantity update calculating unit will be described below in more detail with reference to FIG. 5.

The above-described order prediction models calculated as described above, the actual order history for each user on the same day of the specific date, and as necessary, the above-described order pattern models are input to the order quantity update calculating unit 110 (S401 to S403). Note that, in the example illustrated in FIG. 5, the order pattern models are input after the order history on the same day, but these may be input to the order quantity update calculating unit 110 in any order and these may be all simultaneously input to the order quantity update calculating unit 110.

Based on the input information, the order quantity update calculating unit 110 calculates the updated order prediction model for each user along the chronological sequence, the updated order prediction model for each attribute along the chronological sequence, and/or the updated order prediction model for the entire cafeteria along the chronological sequence by a Bayesian statistical method (S404). Specifically, in a case where the order prediction model for each user is input, the order quantity update calculating unit 110 calculates the updated order prediction model for each user along the chronological sequence, which is obtained by updating the order prediction model for each user by a Bayesian statistical method based on the actual order history of a specific date for each user and calculates the updated order prediction model for the entire cafeteria along the chronological sequence of the specific date based on the updated order prediction model for each user (S404). In a case where the order prediction model for each attribute is input, the order quantity update calculating unit 110 calculates the updated order prediction model for each attribute along the chronological sequence, which is obtained by updating the order prediction model for each attribute by a Bayesian statistical method based on the actual order history of a specific date for each user and calculates the updated order prediction model for the entire cafeteria along the chronological sequence of the specific date based on the updated order prediction model for each attribute (S404). In a case where the order prediction model for the entire cafeteria is input, the order quantity update calculating unit 110 calculates the updated order prediction model for the entire cafeteria along the chronological sequence of the specific date, which is obtained by updating the order prediction model for the entire cafeteria by a Bayesian statistical method based on the actual order history of a specific date for each user (S404).

On a specific date, each time a user places an order at the cafeteria, the order history on the same day is updated in real time, and thus the order quantity update calculating unit 110 can calculate each above-described updated order prediction model at any frequency. Each above-described updated order prediction model thus calculated may be transmitted to and stored in the updated order prediction model database included in the order quantity predicting system as necessary.

(Processing Flow of Correction Parameter Calculating Unit)

An example of the processing flow of the correction parameter calculating unit will be described below in more detail with reference to FIG. 6.

At any timing (for example, after the cafeteria closes on a specific date), the updated order prediction models of the specific date (preferably the latest updated order prediction models of the specific date) and the actual same-day order history for each user of the specific date (preferably, the actual same-day order history for each user of the specific date at the entire cafeteria) are input to the correction parameter calculating unit 111 (S501 to S502). Note that, in the example illustrated in FIG. 6, the above-described order history is input after the above-described updated order prediction models, but these may be input to the correction parameter calculating unit 111 in any order or these may be all simultaneously input to the correction parameter calculating unit 111.

Based on the input information, the correction parameter calculating unit 111 can calculate the above-described correction parameters by, for example, machine learning (for example, deep learning). The above-described correction parameters thus calculated may be transmitted to and stored in any storage unit or database (for example, the order pattern model database) included in the order quantity predicting system as necessary.

[Cafeteria Order System]

According to an aspect of the present disclosure, a cafeteria order system is provided, the cafeteria order system including:
the order quantity predicting system;
an order receiving system configured to transmit an actual order history of a specific date for each user to the order quantity predicting system; and
a display system configured to display the order prediction model for the entire cafeteria and/or the updated order prediction model for the entire cafeteria.

An outline of an example of the cafeteria order system will be described below with reference to FIG. 8. A cafeteria order system 11 may be capable of mutually transmitting and receiving data and the like to and from the order quantity predicting system 1, the order receiving system 2, the display system 3, and/or the user terminal 4 by wireless communication and/or wired communication through the communication network NW.

The above-described cafeteria order system may be a standalone system or a cloud-based system.

(Order Receiving System)

An example of functional blocks of the order receiving system will be described below with reference to FIG. 9. The order receiving system 2 may include a processing unit 201, a payment unit 202, a user information identifying unit 203, an order receiving unit 204, a display unit 205, a storage unit 206, a communication unit 207, and/or an input-output interface unit 208. The order receiving system 2 may include other functional blocks as necessary.

The processing unit 201 can perform various kinds of processing, calculation, and the like.

The payment unit 202 is not particularly limited as long as the payment unit 202 has a configuration that allows payment. For example, the payment unit 202 may have a well-known configuration that allows cash payment, credit card payment, and two-dimensional code payment. The payment unit 202 may have a configuration that allows payment by using employee ID cards, student ID cards, membership cards, and the like.

The user information identifying unit 203 can identify user information of a person having placed an order. For example, the user information may be identified based on an identification number (for example, an employee number or a student number) input by a user, a staff, or the like, or the user information may be identified based on information read by any linked reader (for example, a two-dimensional code reader or a camera). An example is a method of reading an employee ID card or a student ID card by using the above-described reader.

The order receiving unit 204 can receive the contents of an order placed by a user. Individual ordered menu items may be manually input by a staff or may be input by reading codes (for example, barcodes or two-dimensional codes) bonded to a meal table or the like by using a barcode reader or a camera. Note that codes may be bonded to dishes and other containers. When inputting order contents by reading a code, a user placing the order may read a code on a meal table or the like by using a barcode reader or a camera, without the need to assign staff.

The display unit 205 may be, for example, a display, a monitor, or a speaker.

The storage unit 206 can store various kinds of information and data.

The communication unit 207 can mutually transmit and receive data and the like by wireless communication and/or wired communication through the communication network NW.

The input-output interface unit 208 is connected to an input unit 209 and/or an output unit 210 that are built in and/or externally connected, and can control the input unit 209 and/or the output unit 210 (note that the input unit 209 and the output unit 210 are omitted in FIG. 9). Examples of the input unit 209 include a keyboard, a mouse, and a microphone. Examples of the output unit 210 include a display, a monitor, and a speaker.

The functional blocks of the order receiving system 2 may be included in one device, or any one or more functional blocks may be included in two or more devices.

According to an aspect of the present disclosure, the above-described order receiving system is a cafeteria cash register system (preferably, a cafeteria POS cash register system).

The above-described order receiving system may be a standalone system or a cloud-based system.

(Display System)

An example of functional blocks of the display system will be described below with reference to FIG. 10. The display system 3 may include a processing unit 301, a display unit 302, a storage unit 303, a communication unit 304, and/or an input-output interface unit 305. The display system 3 may include other functional blocks as necessary.

The processing unit 301 can perform various kinds of processing, calculation, and the like.

The display unit 302 may be, for example, a display, a monitor, or a speaker.

The storage unit 303 can store various kinds of information and data.

The communication unit 304 can mutually transmit and receive data and the like by wireless communication and/or wired communication through the communication network NW.

The input-output interface unit 305 is connected to an input unit 306 and/or an output unit 307 that are built in and/or externally connected, and can control the input unit 306 and/or the output unit 307 (note that the input unit 306 and the output unit 307 are omitted in FIG. 10). Examples of the input unit 306 include a keyboard, a mouse, and a microphone. Examples of the output unit 307 include a display, a monitor, and a speaker.

The above-described order receiving system may be a standalone system or a cloud-based system.

(User Terminal)

The user terminal is not particularly limited but may be a smartphone, a personal computer, a tablet, or the like.

[Method of Predicting Order Quantities in Cafeteria]

According to another aspect of the present disclosure, a method of predicting order quantities in a cafeteria is provided, the method including:

generating an order pattern model for each user along the chronological sequence and/or an order pattern model for each attribute along the chronological sequence based on information stored in a past order history database and information stored in an external factor database;

calculating an order prediction model for each user along the chronological sequence of a specific date and/or an order prediction model for each attribute along the chronological sequence of the specific date based on the order pattern model for each user and/or the order pattern model for each attribute, a menu of the specific date, and information related to the specific date and stored in the external factor database;

calculating an order prediction model for the entire cafeteria along the chronological sequence of the specific date based on the sum of the order prediction model for each user and/or the order prediction models for each attribute;

calculating an updated order prediction model for each user along the chronological sequence and/or an updated order prediction model for each attribute along the chronological sequence, which is obtained by updating the order prediction model for each user and/or the order prediction model for each attribute by a Bayesian statistical method based on an actual order history of a specific date for each user; and calculating an updated order prediction model for the entire cafeteria along the chronological sequence of the specific date based on the updated order prediction model for each user and/or the updated order prediction model for each attribute, in which the past order history database is configured to store a past order history in the cafeteria for each user in association with attribute information of the user and the chronological sequence, and the external factor database is configured to store any information except for the order history in association with the chronological sequence.

According to another aspect of the present disclosure, a method of predicting order quantities in a cafeteria is provided, the method including:

generating an order pattern model for each user along the chronological sequence and/or an order pattern model for each attribute along the chronological sequence based on information stored in a past order history database and information stored in an external factor database;

calculating an order prediction model for each user along the chronological sequence of a specific date and/or an order prediction model for each attribute along the chronological sequence of the specific date based on the order pattern model for each user and/or the order pattern model for each attribute, a menu of the specific date, and information related to the specific date and stored in the external factor database;

calculating an order prediction model for the entire cafeteria along the chronological sequence of the specific date based on the sum of the order prediction model for each user and/or the order prediction models for each attribute; and calculating an updated order prediction model for the entire cafeteria along the chronological sequence of a specific date, which is obtained by updating the order prediction model for the entire cafeteria by a Bayesian statistical method based on an actual order history of the specific date for each user, in which the past order history database is configured to store a past order history in the cafeteria for each user in association with attribute information of the user and the chronological sequence, and the external factor database is configured to store any information except for the order history in association with the chronological sequence.

According to another aspect of the present disclosure, a method of predicting order quantities in a cafeteria is provided, the method including:

generating an order pattern model for the entire cafeteria along the chronological sequence based on information stored in a past order history database and information stored in an external factor database;

calculating an order prediction model for the entire cafeteria along the chronological sequence of a specific date based on the order pattern model for the entire cafeteria, a menu of the specific date, and information related to the specific date and stored in the external factor database; and calculating an updated order prediction model for the entire cafeteria along the chronological sequence of a specific date, which is obtained by updating the order prediction model for the entire cafeteria by a Bayesian statistical method based on an actual order history of the specific date for each user, in which the past order history database is configured to store a past order history in the cafeteria for each user in association with attribute information of the user and the chronological sequence, and the external factor database is configured to store any information except for the order history in association with the chronological sequence.

According to another preferable aspect of the present disclosure, the above-described method further includes calculating correction parameters used for correcting the order pattern model for each user, the order pattern model for each attribute, and/or the order pattern model for the entire cafeteria based on the updated order prediction model for the entire cafeteria and an actual order quantity for the entire cafeteria of the specific date.

[Program or the Like Configured to Predict Order Quantities in Cafeteria]

According to another aspect of the present disclosure, a program for causing a calculation device to execute the above-described method is provided.

According to another aspect of the present disclosure, a recording medium that records the above-described program and is readable by a calculation device is provided.

According to another aspect of the present disclosure, a calculation device that records the above-described program in an internal storage unit is provided.

More specific aspects of the order quantity predicting system and the cafeteria order system of the present disclosure will be described below with reference to FIG. 11 and the like. FIG. 11 illustrates an example of a cooperate cafeteria in a company.

An order quantity predicting system 1A is capable of mutually transmitting and receiving data and the like to and from an order receiving system 2A, a display system 3A, and a user terminal 4A (not illustrated) used by a user A through a network NW (not illustrated).

A past order history database 101A stores the past order history for each user in the cafeteria, which stores detailed behavior of the user in the cafeteria. The past order history database 101A may obtain the order history, for example, information on the time and contents of an order by each user from the linked order receiving system 2A and may store the order history in association with the attributes (for example, sex, age, assigned department, and job position) of the user. Specifically, the past order history database 101A can store, along the chronological sequence, information on what reservations and orders all users made, what eating behaviors they exhibited, and what times they did so, for a certain duration (for example, a week, a month, a year, or longer) in the cafeteria. The past order history database 101A stores, for example, information exemplarily illustrated in FIG. 12.

An external factor database 102A inputs and stores the external factor information such as weather information from a weather information storing agency such as a meteorological agency in association with the chronological sequence. The external factor information may be input at any frequency.

An order pattern model generating unit 108A performs multiple regression analysis based on the past order history along the chronological sequence for each user, which is stored in the past order history database 101A, and the external factor information such as weather information along the chronological sequence, which is stored in the external factor database 102A, and generates the order pattern model for each user along the chronological sequence, the order pattern model for each attribute (for example, sex, age, assigned department, or job position) along the chronological sequence, and/or the order pattern model for the entire cafeteria (S601 to S603). The multiple regression analysis may be calculation by spreadsheet software or the like or may be machine learning (for example, deep learning). As the multiple regression analysis, for example, box plot analysis or Pearson correlation analysis is performed. The result of the multiple regression analysis may be stored in, for example, any database or storage unit included in an order quantity reservation system 1A.

FIGS. 13 and 14 illustrate examples of the result of the multiple regression analysis by the order pattern model generating unit 108A. From FIG. 13, it is understood that daily miso soup sells well around 12:10 and kake udon/soba sells well around 12:40. In addition, from FIG. 13, it is understood that Chinese-style noodles sell well around 12:40 in lunchtime and sell well around 10:10 in morning. In this manner, it is possible to interpret sales performance of specific menu items over time and order placement quantities for each menu item during normal business hours through box plot analysis.

FIG. 14 illustrates an example in which weather-related information such as weather conditions, temperature, and humidity was obtained from an external agency such as a meteorological agency and the relation between such external factor information and the order quantity for each menu item was analyzed by "Pearson correlation analysis". In FIG. 14, the correlation relation between the order quantity for each menu item and weather-related information such as weather conditions is calculated. A value of 0 indicates no relation, a positive value close to 1 indicates a high likelihood of the positive correlation, and a negative value close to −1 indicates a high likelihood of the negative correlation. By analyzing combinations in various ways, it is possible to evaluate the relation between various external factors and the order quantity for each menu item.

FIGS. 15 and 16 illustrate examples of the order pattern model for each user, which is generated by the order pattern model generating unit 108A. The example of FIG. 15 is the order pattern model for Person A at a managerial position. It is calculated as a probability distribution model that Person A tends to visit the cafeteria around 11:45 and order a set meal on sunny days, but on bad weather days, the person tends to come later (for example, around 13:15) and order noodles such as ramen and soba. The example of FIG. 16 is the order pattern model for Person B who is an office worker. It is calculated as a probability distribution model that Person B typically tends to visit the cafeteria around 12:15 and order pasta and tends to order a salad when the person comes later (for example, around 12:45). The generated order pattern model is transmitted to and stored in an order pattern model database 105A (S609).

The past order history database 101A also stores order histories after a specific date X on an ongoing basis. The external factor database 102A stores the external factor information on an ongoing basis. Thus, the order pattern model generating unit 108A may take data out of these databases at any timing, take out order pattern models (for each user, each attribute, and/or the entire cafeteria) stored in the order pattern model database 105A, and may generate order pattern models again, and may repeat this each time. In this manner, the accuracies of the order pattern model for each user, the order pattern model for each attribute, and/or the order pattern model for the entire cafeteria further increase.

The user A can reserve menu items of the specific date X in advance by daily viewing a menu (meal plan) posted on the website of the cafeteria operator, using an IT tool such as an own terminal (for example, a smartphone) or a PC. Reservation information of the user A is transmitted to and stored in an order reservation database 103A (S505). FIG. 17 illustrates an example of the information stored in the order reservation database 103A.

The order reservation information for each user of the specific date X, which is stored in the order reservation database 103A, and the order pattern model for each user, the order pattern model for each attribute, and/or the order pattern model for the entire cafeteria, which are stored in the order pattern model database 105A, and the external factor information such as weather information (in this case, for example, weather forecast of the specific date X) of the specific date X, which is stored in the external factor database, are transmitted to an order quantity prediction calculating unit 109A (S606 to S608). The order quantity prediction calculating unit 109A calculates the order prediction model for each user of the specific date X by machine learning (for example, deep learning) based on these pieces of transmitted information and the menu of the specific date X (S609). This calculation may be multiple regression analysis. The menu of the specific date X may be input each time and transmitted to the order quantity prediction calculating unit 109A of the order quantity predicting system 1A or may be stored in any database or storage unit included in the order quantity predicting system 1A or in an external database or the like not included in the order quantity predicting system 1A and may be transmitted to the order quantity prediction calculating unit 109A (not illustrated). The order prediction model for each user of the specific date X, the order prediction model for each attribute of the specific date X, and/or the order prediction model for the entire cafeteria of the specific date X, which are thus calculated, are transmitted to and stored in an order prediction model database 106A. The order quantity prediction calculating unit 109A may be set in advance to generate the above-described order prediction models at any timing (for example, one day or one week before the specific date X). The order quantity prediction calculating unit 109A may calculate the above-described order prediction models every plurality of specific dates (for example, two days, a week, a month, three months, or longer).

FIGS. 18 and 19 illustrate examples of an order prediction model generated by the order quantity prediction calculating unit 109A (the order prediction model for each user of the specific date X). For example, in the above-described case of Person A, the order quantity prediction calculating unit 109A expects that, since there is a high likelihood that the person attends a headquarters meeting as a manager on the specific date X, there is a significantly high probability that the person comes for lunch around 13:30 and a high likelihood that the person orders something light such as soba, and calculates an order prediction model (probability distribution model) in FIG. 18 as prior distribution for Person A of the specific date X. In the above-described case of Person B, the order quantity prediction calculating unit 109A expects that, since Person B has no special meetings or the like on the specific date X, there is a high likelihood that the person comes around 12:30 as usual, and calculates an order prediction model (probability distribution model) in FIG. 19 as prior distribution for Person B of the specific date X.

The order quantity prediction calculating unit 109A may calculate the order prediction model for the entire cafeteria of the specific date X based on the calculated order prediction model for each user of the specific date X and/or the calculated order prediction model for each attribute of the specific date X (S609). Specifically, the order quantity prediction calculating unit 109A can calculate the order prediction model for the entire cafeteria of the specific date X based on the sum of the order prediction models of the specific date X for all users belonging to the organization and/or the sum of the order prediction model of the specific date X for each attribute of the users belonging to the organization. This calculation may be performed by spreadsheet software, machine learning, or the like. FIG. 20 illustrates an example of the calculated order prediction model for the entire cafeteria of the specific date X. The calculated order prediction model for the entire cafeteria of the specific date X is transmitted to and stored in the order prediction model database 106A (S610).

Note that, in a case where there exist two or more of the order prediction model (a) for the entire cafeteria, which is calculated based on the sum of the order prediction model for each user of the specific date X, the order prediction model (B) for the entire cafeteria, which is calculated based on the sum of the order prediction model for each attribute of the specific date X, and the order prediction model (y) for the entire cafeteria of the specific date X, which is calculated based on the order pattern model for the entire cafeteria, each model may be weighted to calculate the order prediction model for the entire cafeteria of the specific date X. Calculation including such weighting may be performed by the order quantity prediction calculating unit 109A (for example, by machine learning such as deep learning). Parameters and the like used for the weighting may be calculated by machine learning (for example, deep learning) based on, for example, the external factor information of the specific date X, which is stored in the external factor database 102A, the order prediction models ($\alpha$, $\beta$, $\gamma$) for the entire cafeteria of the specific date X, which are calculated by the respective calculation methods, and the actual order quantity for the entire cafeteria of the specific date X. Note that parameters and the like used for the above-described weighting may be performed by a correction parameter calculating unit 111A to be described later. Alternatively, parameters and the like used for the above-described weighting may be set in advance based on, for example, past knowledge and experience of a cafeteria operating company C.

Since information stored in the order reservation database 103A, the external factor database 102A, and the like is updated on an ongoing basis until the specific date X, the order quantity prediction calculating unit 109A may calculate the order prediction model for each user of the specific date X, the order prediction model for each attribute of the specific date X, and/or the order prediction model for the entire cafeteria of the specific date X at any timing (for example, at a specific time every day until the specific date X). The order prediction models calculated again in this manner may be transmitted to and stored in the order prediction model database 106A. For example, one week before the specific date X, the weather forecast for the specific date X was sunny, and each order prediction model of the specific date X was calculated based on this information by the order quantity prediction calculating unit 109A and stored in the order prediction model database 106A. However, two days before the specific date X, the weather forecast for the specific date X was heavy rain, and each order prediction model of the specific date X may be calculated again based on this information by the order quantity prediction calculating unit 109A and stored in the order prediction model database 106A (FIG. 21).

On the same day of the specific date X, the latest order prediction model for the entire cafeteria of the specific date X, which is stored in the order prediction model database 106A, is transmitted to the display system 3A and displayed (S611). Before the opening time of the specific date X, a chef (for example, head chef) of the cafeteria operating company C prepares meals based on the order prediction model displayed on the display system 3A.

On the same day of the specific date X, the user A can actually order reserved menu items at, for example, the order receiving system 2A installed in the cafeteria (S612). On the same day of the specific date X, a user B with no reservation can refer to the menu on the same day (for example, the cafeteria's display or notice board, or a menu table (meal table) presented by the actual menu or models in some cases) and select a menu item to order by operating the order receiving system 2A (S613). The user B is assumed to be someone who has not made an action such as reservation before visiting the cafeteria unlike the user A and casually visits the cafeteria during lunch time, for example. After visiting the cafeteria and selecting a desired menu item, the user B needs to make a payment, and the payment can be performed by tapping an own terminal (for example, a smartphone) on a card reader attached or embedded in the order receiving system 2A. The payment may be made without using this terminal and may be made by using, for example, an IC card (for example, an employee ID card). In FIG. 11, the order receiving system 2A is illustrated as one system, but the order receiving system 2A may include a plurality of IT instruments such as a combination of a large display and a cash register system or a combination of a display and a card reader or a PC. Note that, the order receiving system 2A in FIG. 11 may be a cafeteria cash register payment system with which it is possible to not only order a menu item but also make payment of the menu item.

Data of the payment, in other words, the actual order history on the same day of the specific date X, which includes the attributes of the users A and B, the time of order, which menu items were ordered, and how many of them is transmitted from the order receiving system 2A to the order quantity reservation system 1A and stored in a same-day order history database 104A (S614). The data may be transmitted from the order receiving system 2A to the past order history database 101A and stored (not illustrated). Alternatively, the data may be transmitted from the same-day order history database 104A to the past order history database 101A and stored at any timing (for example, after the business hours of the specific date X) (not illustrated). FIG. 22 illustrates an example of information stored in the same-day order history database 104A.

The actual order history (same-day order history) may be transmitted to the same-day order history database 104A and/or the past order history database 101A at any frequency (for example, at any time) and can be set as appropriate through cooperation with the order quantity predicting system 1A and/or the order receiving system 2A. The actual order history is preferably transmitted in near real time.

The same-day order history stored in the same-day order history database 104A is transmitted to an order quantity update calculating unit 110A at any timing (for example, every minute, every five minutes, every 10 minutes, or every 30 minutes) (S615). The latest order prediction models for each user, for each attribute, and/or for the entire cafeteria of the specific date X, which are stored in the order prediction model database 106A, are transmitted to the order quantity update calculating unit 110A (S616). The transmission frequency of the order prediction models may be, for example, the same as the transmission frequency of the same-day order history. The order quantity update calculating unit 110A calculates the updated order prediction model (in other words, posterior distribution) for each user, which is updated by Bayesian inference based on the transmitted order prediction models (prior distributions) and the transmitted same-day order history (S617). As necessary, the order quantity update calculating unit 110A may calculate the updated order prediction model by Bayesian inference with reference to the order pattern model for each user, the order pattern model for each attribute, and/or the order pattern model for the entire cafeteria, which are stored in the order pattern model database 105A (for example, by using them as likelihood functions). In other words, the order quantity update calculating unit 110A can use the order prediction models as prior distributions and perform Bayesian updating based on the same-day order history and, if necessary, the order pattern models, to calculate the updated order prediction model as a posterior distribution. This calculation may be performed by machine learning (for example, deep learning).

The order quantity update calculating unit 110A can calculate the updated order prediction model for the entire cafeteria of the specific date X based on the updated order prediction model for each user, which is updated (S617). For example, the order quantity update calculating unit 110A can apply the updated order prediction model to a group of users who have already placed orders before the calculation is performed and the order prediction model to a group of users who have not placed orders in the cafeteria, and can calculate the updated order prediction model for the entire cafeteria on the same day of the specific date X based on the sum of these. This calculation may be performed by spreadsheet software, machine learning, or the like.

The order quantity update calculating unit 110A can calculate the updated order prediction model for the entire cafeteria of the specific date X based on the updated order prediction model for each attribute, which is updated (S617). For example, the order quantity update calculating unit 110A can use the order prediction model for each attribute of the specific date X as a prior distribution, calculate the updated order prediction model for each attribute on the same day of the specific date X by Bayesian inference based on the same-day order history transmitted from the same-day order history database 104A, and calculate the updated order prediction model for the entire cafeteria based on the calculated updated order prediction model for each attribute. This calculation may be performed by spreadsheet software, machine learning, or the like.

The order quantity update calculating unit 110A may calculate the updated order prediction model for the entire cafeteria of the specific date X based on the order prediction model for the entire cafeteria of the specific date X (S617). For example, the order quantity update calculating unit 110A can use the order prediction model for the entire cafeteria of the specific date X as a prior distribution and calculate the updated order prediction model for the entire cafeteria on the same day of the specific date X by Bayesian inference based on the same-day order history transmitted from the same-day order history database 104A. This calculation may be performed by machine learning or the like. FIG. 23 illustrates an example of the calculated updated order prediction model for the entire cafeteria on the same day of the specific date X.

The calculated updated order prediction models for each user, for each attribute, and/or for the entire cafeteria on the same day of the specific date X are transmitted to and stored in an updated order prediction model database 107A (S618). The updated order prediction model for the entire cafeteria, which is calculated in this manner is transmitted to the display system 3A and displayed (S619). A chef (for example, head chef) of the cafeteria operating company C can adjust the amount of food to be prepared based on the updated order prediction model displayed on the display system 3A.

It can be said that on the same day of the specific date X, the same-day order history database 104A is updated each time a user comes to the cafeteria. Thus, the order quantity update calculating unit 110A may use the latest updated order prediction models stored in the updated order prediction model database 107A as prior distributions (S620) and may calculate the updated order prediction models for each user, for each attribute, and/or for the entire cafeteria again (S617) based on input of the same-day order history to the same-day order history database 104A, which is updated in real time (S615). Then, the updated order prediction models calculated again in this manner are transmitted to and stored in the updated order prediction model database 107A (S618) and transmitted to the display system 3A and displayed (S619). For example, in a case where a user D comes to the cafeteria at a time significantly earlier than usual (for example, the user usually comes to the cafeteria around 12:30, but on the specific date X, the user comes to the cafeteria around 11:30) and orders "tonkatsu", which the user does not usually order, such a same-day order history is used to update the order prediction model for the user D and/or the order prediction model for an attribute of the user D (prior distributions) based on Bayesian inference, calculate the updated order prediction model for the user D and/or the updated order prediction model for the attribute of the user D (posterior distributions), and calculate the updated order prediction model for the entire cafeteria as well.

A chef (for example, head chef) of the cafeteria operating company C can adjust the amount of ingredients to be prepared and the amount of meals to be cooked in real time with reference to the updated order prediction models (in other words, order prediction quantities along the chronological sequence) displayed on the display system 3A and updated in real time.

After the business hours of the cafeteria of the specific date X, the latest updated order prediction models for each user, for each attribute, and/or for the entire cafeteria, which are stored in the updated order prediction model database 107A may be transmitted to and stored in any database or storage unit (for example, the order pattern model database 105A) included in the order quantity predicting system 1A (not illustrated). Then, the updated order prediction models transmitted and stored in this manner may be transmitted to the order quantity prediction calculating unit 109A together with the order pattern models stored in the order pattern model database 105A as necessary (S608), and the order prediction models may be calculated again (S609). Alternatively, after the business hours of the cafeteria of the specific date X, the latest updated order prediction models for each user, for each attribute, and/or for the entire cafeteria, which are stored in the updated order prediction model database 107A may be transmitted to the order quantity prediction calculating unit 109A together with the order pattern models stored in the order pattern model database 105A as necessary (S608), and the order prediction models may be calculated again (S609).

After the business hours of the cafeteria of the specific date X, the latest updated order prediction models for each user, for each attribute, and/or for the entire cafeteria, which are stored in the updated order prediction model database 107A, and information on the actual order quantity for the entire cafeteria of the specific date X (the information may be stored in the same-day order history database 104A, for example) may be transmitted to the correction parameter calculating unit 111A (S621), and a correction parameter may be calculated by machine learning (for example, deep learning) based on these pieces of transmitted information (S622). The correction parameter represents the gap between the above-described updated order prediction models for each user, for each attribute, and/or for the entire cafeteria of the specific date X and the actual order quantities of the specific date X. The calculated correction parameter may be transmitted to and stored in any storage unit or database (for example, the order pattern model database 105A) included in the order quantity predicting system 1A (S623). The correction parameter stored in this manner may be transmitted to the order pattern model generating unit 108A together with information (S601) stored in the past order history database 101A and/or information (S602) stored in the external factor database 102A (not illustrated) and may be used to generate the order pattern models for each user, for each attribute, and/or for the entire cafeteria (S603). The correction parameter stored in this manner may be transmitted to the order quantity prediction calculating unit 109A together with information (S606) stored in the order reservation database 103A, information (S607) stored in the external factor database 102A, and/or the order pattern models (S608) stored in the order pattern model database (not illustrated) and may be used to generate the order prediction models for each user, for each attribute, and/or for the entire cafeteria (S609). In this manner, by generating or calculating the above-described order pattern models and/or the above-described order prediction models with the correction parameter calculated by the correction parameter calculating unit, it is advantageous in that the accuracies of the above-described order pattern models and/or the above-described order prediction models further increase.

The present disclosure includes the following.

[1] An order quantity predicting system for a cafeteria, the order quantity predicting system including a past order history database, an external factor database, an order pattern model generating unit, an order quantity prediction calculating unit, and an order quantity update calculating unit, in which
the past order history database configured to store a past order history in the cafeteria for each user in association with attribute information of the user and the chronological sequence,
the external factor database configured to store any information except for the order history in association with the chronological sequence,
the order pattern model generating unit configured to generate an order pattern model for each user along the chronological sequence, an order pattern model for each attribute along the chronological sequence, and/or an order pattern model for the entire cafeteria along the chronological sequence based on information stored in the past order history database and information stored in the external factor database,
the order quantity prediction calculating unit configured to
(1) calculate an order prediction model for each user along the chronological sequence of a specific date based on an order pattern model for each user, a menu of the specific date, and information related to the specific date and stored in the external factor database, and calculate an order prediction model for the entire cafeteria along the chronological sequence of the specific date based on the sum of the order prediction model for each user,
(2) calculate an order prediction model for each attribute along the chronological sequence of a specific date based on the order pattern model for each attribute, a menu of the specific date, and information related to the specific date and stored in the external factor database, and calculate an order prediction model for the entire cafeteria along the chronological sequence of the specific date based on the sum of the order prediction model for each attribute, and/or
(3) calculate an order prediction model for the entire cafeteria along the chronological sequence of a specific date based on the order pattern model for the entire cafeteria, a menu of the specific date, and information related to the specific date and stored in the external factor database, and
the order quantity update calculating unit configured to
(1) calculate an updated order prediction model for each user along the chronological sequence, which is obtained by updating the order prediction model for each user by a Bayesian statistical method based on an actual order history of a specific date for each user, and calculate an updated order prediction model for the entire cafeteria along the chronological sequence of the specific date based on the updated order prediction model for each user, (2) calculate an updated order prediction model for each attribute along the chronological sequence, which is obtained by updating the order prediction model for each attribute by a Bayesian statistical method based on an actual order history of a specific date for each user, and calculate an updated order prediction model for the entire cafeteria along the chronological sequence of the specific date based on the updated order prediction model for each attribute, and/or (3) calculate an updated order prediction model for the entire cafeteria along the chronological sequence of the specific date, which is obtained by updating the order prediction model for the entire cafeteria by a Bayesian statistical method based on an actual order history of a specific date for each user.

[2] The order quantity predicting system according to [1], in which the external factor database is configured to store at least one selected from a group consisting of weather information and event information within an organization.

[3] The order quantity predicting system according to [1] or [2], in which the order quantity prediction calculating unit is configured to calculate the order prediction model for each user, the order prediction model for each attribute, and/or the order prediction model for the entire cafeteria further based on order reservation information for each user of the specific date.

[4] The order quantity predicting system according to any one of [1] to [3], in which the Bayesian statistical method is Bayesian inference.

[5] The order quantity predicting system according to [3], further including an order reservation database configured to store the order reservation information for each user.

[6] The order quantity predicting system according to any one of [1] to [5], further including an order pattern model database configured to store the order pattern model for each user, the order pattern model for each attribute, and/or the order pattern model for the entire cafeteria.

[7] The order quantity predicting system according to any one of [1] to [6], further including an order prediction model database configured to store the order prediction model for each user, the order prediction model for each attribute, and/or the order prediction model for the entire cafeteria.

[8] The order quantity predicting system according to any one of [1] to [7], further including an updated order prediction model database configured to store the updated order prediction model for each user, the updated order prediction model for each attribute, and/or the updated order prediction model for the entire cafeteria.

[9] The order quantity predicting system according to any one of [1] to [8], in which
the order quantity predicting system further includes a correction parameter calculating unit, and
the correction parameter calculating unit is configured to calculate correction parameters used for correcting the order pattern model for each user, the order pattern model for each attribute, and/or the order pattern model for the entire cafeteria based on the updated order prediction model for the entire cafeteria and an actual order quantity for the entire cafeteria of the specific date.

[10] A cafeteria order system including:
the order quantity predicting system according to any one of [1] to [9];
an order receiving system configured to transmit an actual order history of a specific date for each user to the order quantity predicting system; and
a display system configured to display the order prediction model for the entire cafeteria and/or the updated order prediction model for the entire cafeteria.

[11] A method of predicting order quantities in a cafeteria (preferably performed by one or more computer(s)), the method including:
generating an order pattern model for each user along the chronological sequence and/or an order pattern model for each attribute along the chronological sequence based on information stored in a past order history database and information stored in an external factor database;
calculating an order prediction model for each user along the chronological sequence of a specific date and/or an order prediction model for each attribute along the chronological sequence of the specific date based on the order pattern model for each user and/or the order pattern model for each attribute, a menu of the specific date, and information related to the specific date and stored in the external factor database;
calculating an order prediction model for the entire cafeteria along the chronological sequence of the specific date based on the sum of the order prediction model for each user and/or the order prediction models for each attribute;
calculating an updated order prediction model for each user along the chronological sequence and/or an updated order prediction model for each attribute along the chronological sequence, which is obtained by updating the order prediction model for each user and/or the order prediction model for each attribute by a Bayesian statistical method based on an actual order history of a specific date for each user; and
calculating an updated order prediction model for the entire cafeteria along the chronological sequence of the specific date based on the updated order prediction model for each user and/or the updated order prediction model for each attribute, in which
the past order history database is configured to store a past order history in the cafeteria for each user in association with attribute information of the user and the chronological sequence, and
the external factor database is configured to store any information except for the order history in association with the chronological sequence.

[12] A method of predicting order quantities in a cafeteria (preferably performed by one or more computer(s)), the method including:
generating an order pattern model for each user along the chronological sequence and/or an order pattern model for each attribute along the chronological sequence based on information stored in a past order history database and information stored in an external factor database;
calculating an order prediction model for each user along the chronological sequence of a specific date and/or an order prediction model for each attribute along the chronological sequence of the specific date based on the order pattern model for each user and/or the order pattern model for each attribute, a menu of the specific date, and information related to the specific date and stored in the external factor database;

calculating an order prediction model for the entire cafeteria along the chronological sequence of the specific date based on the sum of the order prediction model for each user and/or the order prediction models for each attribute; and calculating an updated order prediction model for the entire cafeteria along the chronological sequence of the specific date, which is obtained by updating the order prediction model for the entire cafeteria by a Bayesian statistical method based on an actual order history of a specific date for each user, in which the past order history database is configured to store a past order history in the cafeteria for each user in association with attribute information of the user and the chronological sequence, and the external factor database is configured to store any information except for the order history in association with the chronological sequence.

[13] A method of predicting order quantities in a cafeteria (preferably performed by one or more computer(s)), the method including:

generating an order pattern model for the entire cafeteria along the chronological sequence based on information stored in a past order history database and information stored in an external factor database;

calculating an order prediction model for the entire cafeteria along the chronological sequence of a specific date based on the order pattern model for the entire cafeteria, a menu of the specific date, and information related to the specific date and stored in the external factor database; and calculating an updated order prediction model for the entire cafeteria along the chronological sequence of a specific date, which is obtained by updating the order prediction model for the entire cafeteria by a Bayesian statistical method based on an actual order history of the specific date for each user, in which the past order history database is configured to store a past order history in the cafeteria for each user in association with attribute information of the user and the chronological sequence, and the external factor database is configured to store any information except for the order history in association with the chronological sequence.

[14] The method according to any one of to [13], further including calculating correction parameters used for correcting the order pattern model for each user, the order pattern model for each attribute, and/or the order pattern model for the entire cafeteria based on the updated order prediction model for the entire cafeteria and an actual order quantity for the entire cafeteria of the specific date.

What is claimed is:

1. An order quantity predicting system for a cafeteria, the order quantity predicting system comprising:

a past order history database configured to store a past order history in the cafeteria for each user in association with attribute information of the user and the chronological sequence, an external factor database configured to store any information except for the order history in association with the chronological sequence, an order pattern model database configured to store an order pattern model for each user along the chronological sequence, an order pattern model for each attribute along the chronological sequence, and/or an order pattern model for the entire cafeteria along the chronological sequence, an order prediction model database configured to store an order prediction model for each user along the chronological sequence of a specific date, an order prediction model for each attribute along the chronological sequence of a specific date, and/or an order prediction model for the entire cafeteria along the chronological sequence of a specific date, and one or more calculation devices that are connected to one another through a communication network, the one or more calculation devices configured to:

receive information stored in the past order history database and information stored in the external factor database, and then generate the order pattern model for each user along the chronological sequence, the order pattern model for each attribute along the chronological sequence, and/or the order pattern model for the entire cafeteria along the chronological sequence based on the received information, transmit the generated order pattern model for each user, the generated order pattern model for each attribute, and/or the generated order pattern model for the entire cafeteria to the order pattern model database;

receive the generated order pattern model for each user stored in the order pattern model database, a menu of the specific date, and information related to the specific date stored in the external factor database, and then calculate the order prediction model for each user along the chronological sequence of the specific date based on the received generated order pattern model for each user, the received menu of the specific date, and the received information related to the specific date stored in the external factor database, and then calculate an order prediction model for the entire cafeteria along the chronological sequence of the specific date based on the sum of the calculated order prediction model for each user, receive the generated order pattern model for each attribute stored in the order pattern model database, a menu of the specific date, and information related to the specific date stored in the external factor database, and then calculate the order prediction model for each attribute along the chronological sequence of the specific date based on the received generated order pattern model for each attribute, the received menu of the specific date, and the received information related to the specific date stored in the external factor database, and then calculate an order prediction model for the entire cafeteria along the chronological sequence of the specific date based on the sum of the calculated order prediction model for each attribute, and/or receive the generated order pattern model for the entire cafeteria stored in the order pattern model database, a menu of the specific date, and information related to the specific date stored in the external factor database, and then calculate an order prediction model for the entire cafeteria along the chronological sequence of the specific date based on the received generated order pattern model for the entire cafeteria, the received menu of the specific date, and the received information related to the specific date and stored in the external factor database, transmit the calculated order prediction model for each user along the chronological sequence of the specific date, the calculated order prediction model for each attribute along the chronological sequence of the specific date, and/or the order prediction model for the entire cafeteria along the chronological sequence of the specific date to the order prediction model database; as well as receive the calculated order prediction model for each user stored in the order prediction model database and an actual order history of a specific date for each user, and then update the received calculated order prediction model for each user by a Bayesian statistical method based on the received actual order history of the specific date for each user, thereby calculate an updated order prediction model for each user along the chronological sequence, and then calculate an updated order prediction model for the entire cafeteria along the chronological sequence of the specific date based on the calculated updated order prediction model for each user, receive the calculated order prediction model for each attribute stored in the order prediction model database and an actual order history of a specific date for each user, and then update the received calculated order prediction model for each attribute by a Bayesian statistical method based on the received actual order history of the specific date for each user, thereby calculate an updated order prediction model for each attribute along the chronological sequence, and then calculate an updated order prediction model for the entire cafeteria along the chronological sequence of the specific date based on the calculated updated order prediction model for each attribute, and/or receive the calculated order prediction model for the entire cafeteria stored in the order prediction model database and an actual order history of a specific date for each user, and then update the received calculated order prediction model for the entire cafeteria by a Bayesian statistical method based on the received actual order history of the specific date for each user, thereby calculate an updated order prediction model for the entire cafeteria along the chronological sequence of the specific date.

2. The order quantity predicting system according to claim 1, wherein the external factor database is configured to store at least one selected from a group consisting of weather information and event information within an organization.

3. The order quantity predicting system according to claim 1, wherein the one or more calculation devices are configured to receive an order reservation information for each user of the specific date, and calculate the order prediction model for each user, the order prediction model for each attribute, and/or the order prediction model for the entire cafeteria further based on the received order reservation information for each user of the specific date.

4. The order quantity predicting system according to claim 3, further comprising an order reservation database configured to store the order reservation information for each user.

5. The order quantity predicting system according to claim 1, wherein the Bayesian statistical method is Bayesian inference.

6. The order quantity predicting system according to claim 1, further comprising an updated order prediction model database configured to store the updated order prediction model for each user, the updated order prediction model for each attribute, and/or the updated order prediction model for the entire cafeteria.

7. The order quantity predicting system according to claim 1, wherein the one or more calculation devices are further configured to:
receive the calculated updated order prediction model for the entire cafeteria and an actual order quantity for the entire cafeteria of the specific date, and then calculate correction parameters used for correcting the order pattern model for each user, the order pattern model for each attribute, and/or the order pattern model for the entire cafeteria based on the received calculated updated order prediction model for the entire cafeteria and the received actual order quantity for the entire cafeteria of the specific date.

8. A cafeteria order system comprising:
the order quantity predicting system according to claim 1;
an order receiving system configured to transmit an actual order history of a specific date for each user to the order quantity predicting system; and
a display system configured to display the calculated order prediction model for the entire cafeteria and/or the calculated updated order prediction model for the entire cafeteria.

* * * * *